(12) United States Patent
Mattila et al.

(10) Patent No.: US 11,914,767 B2
(45) Date of Patent: *Feb. 27, 2024

(54) GLINT-BASED EYE TRACKER ILLUMINATION USING DUAL-SIDED AND DUAL-LAYERED ARCHITECTURES

(71) Applicant: Microsoft Technology Licensing, LLC, Redmond, WA (US)

(72) Inventors: Marco Ilmari Mattila, Kauniainen (FI); Ari Juhani Tervonen, Vantaa (FI); Simo Kaarlo Tapani Tammela, Espoo (FI); Pasi Antero Kostamo, Kauniainen (FI); Klaus Henrik Valtteri Kalima, Porvoo (FI); Mervi Kaarina Yla-Jarkko, Hameenlinna (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/858,843

(22) Filed: Jul. 6, 2022

(65) Prior Publication Data

US 2022/0365596 A1 Nov. 17, 2022

Related U.S. Application Data

(63) Continuation of application No. 17/322,800, filed on May 17, 2021, now Pat. No. 11,397,465.

(51) Int. Cl.
*G06F 3/01* (2006.01)
*G02B 27/01* (2006.01)

(52) U.S. Cl.
CPC ......... *G06F 3/013* (2013.01); *G02B 27/0172* (2013.01); *G02B 27/0179* (2013.01);
(Continued)

(58) Field of Classification Search
CPC . G06F 3/013; G02B 27/0172; G02B 27/0179; G02B 2027/0123; G02B 2027/0174; G02B 2027/0187
See application file for complete search history.

(56) References Cited

U.S. PATENT DOCUMENTS 10,838,132 B1 * 11/2020 Calafiore ............. G02B 6/0015
11,397,465 B1 * 7/2022 Mattila ..................... G02B 6/00
(Continued)

FOREIGN PATENT DOCUMENTS

WO 2020041067 A1 2/2020

OTHER PUBLICATIONS

"International Search Report and Written Opinion Issued in PCT Application No. PCT/US22/024319", dated Jul. 13, 2022, 13 Pages.
(Continued)

*Primary Examiner* — Dmitriy Bolotin
(74) *Attorney, Agent, or Firm* — Mark K. Young; Mark Young PC

(57) ABSTRACT

In a see-through waveguide-based HMD device configured to display holographic virtual images within a field of view (FOV) of a device user, a glint-based eye tracker illumination system provides infrared (IR) point sources at known locations having a predetermined angular distribution using optical components—including input and output couplers and diffusers—on a waveguide that is located in front of the user's eyes. An input coupler couples light from an IR source into the illumination system waveguide which is propagated to one or more output couplers. Separate diffuser elements aligned with the output couplers distribute the out-coupled IR light into a deterministic range of divergent angles to function as point sources for eye tracker glints. Various illustrative illumination system waveguide architectures are disclosed in which the optical components can be
(Continued)

disposed on the same or opposite sides of the waveguide in dual-layered and dual-sided arrangements.

14 Claims, 23 Drawing Sheets

(52) U.S. Cl.
CPC ............. *G02B 2027/0123* (2013.01); *G02B 2027/0174* (2013.01); *G02B 2027/0187* (2013.01)

(56) References Cited

U.S. PATENT DOCUMENTS

| | | | |
|---|---|---|---|
| 2014/0062868 A1* | 3/2014 | Blixt | G06V 40/19 |
| | | | 345/156 |
| 2015/0009313 A1 | 1/2015 | Noda et al. | |
| 2016/0370583 A1* | 12/2016 | Saarikko | G02B 6/34 |
| 2018/0348527 A1 | 12/2018 | Potnis et al. | |
| 2019/0302882 A1* | 10/2019 | Blixt | A61B 3/113 |
| 2020/0018888 A1 | 1/2020 | Lyu | |
| 2020/0249754 A1* | 8/2020 | Morozov | G02B 6/0023 |
| 2020/0368616 A1* | 11/2020 | Delamont | A63F 13/213 |
| 2022/0060650 A1* | 2/2022 | Tian | H01L 27/14612 |
| 2022/0413284 A1* | 12/2022 | Chao | G01B 11/22 |

OTHER PUBLICATIONS

Sheard, et al., "Focusing Waveguide Grating Coupler using a Diffractive Doublet", In Journal of Applied Optics, vol. 36, Issue 19, Jul. 1, 1997, pp. 4349-4353.

* cited by examiner

1300

1400

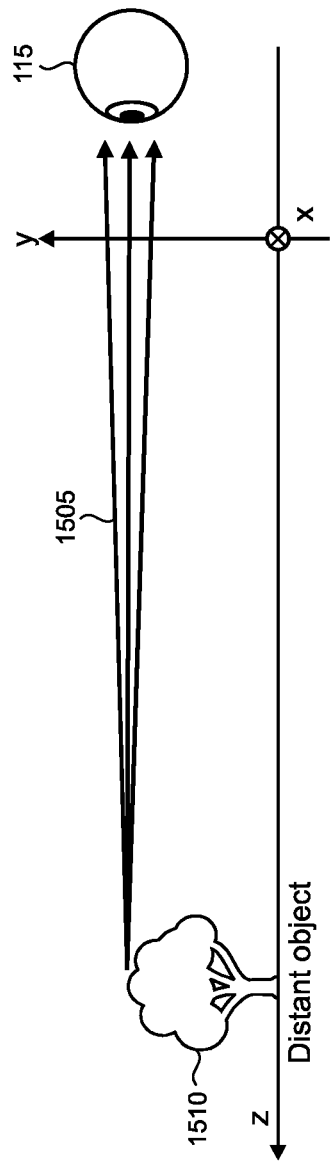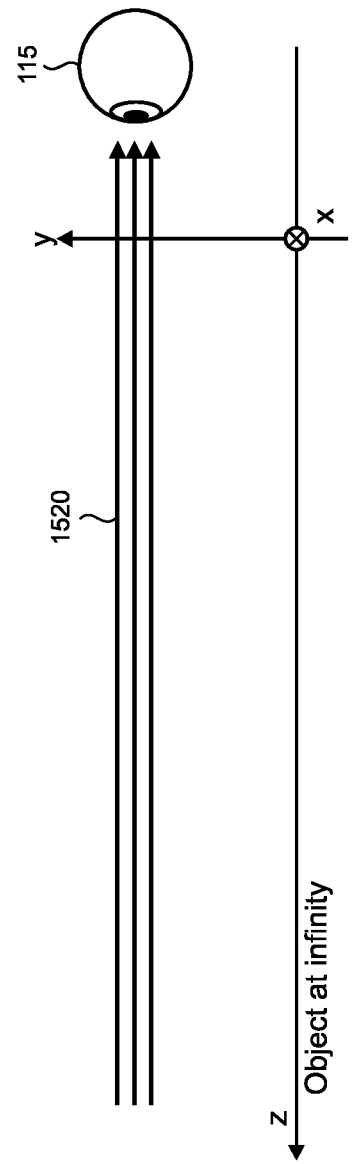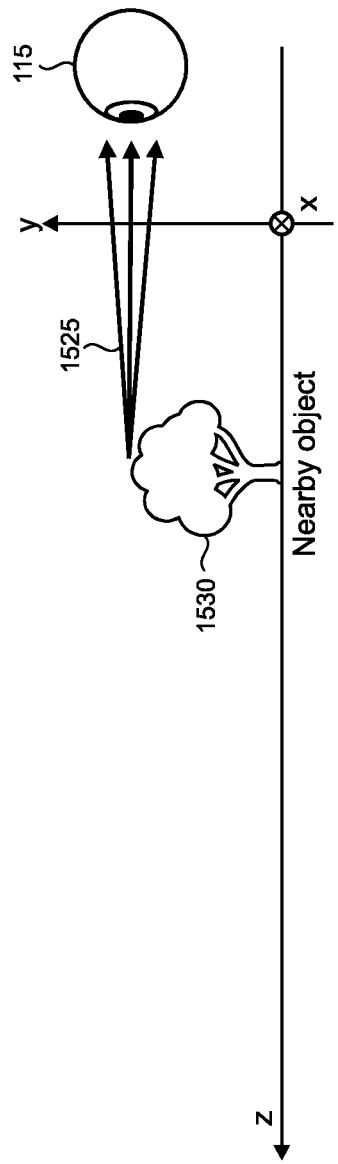
FIG 15A
FIG 15B
FIG 15C

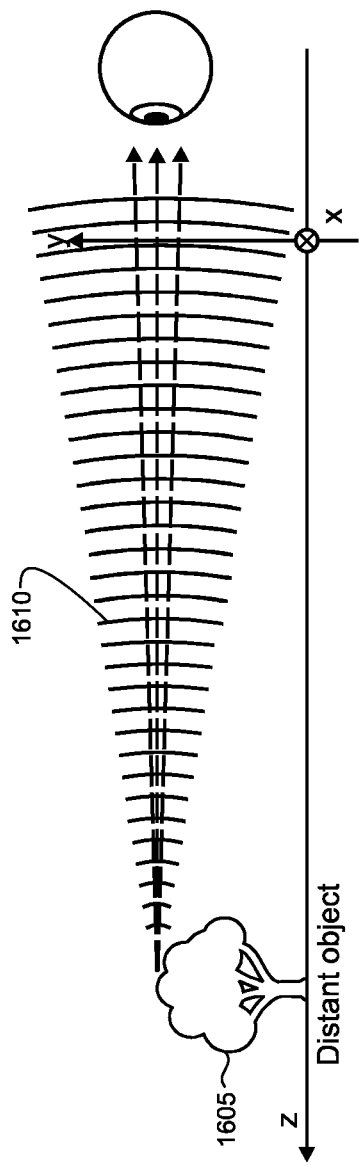 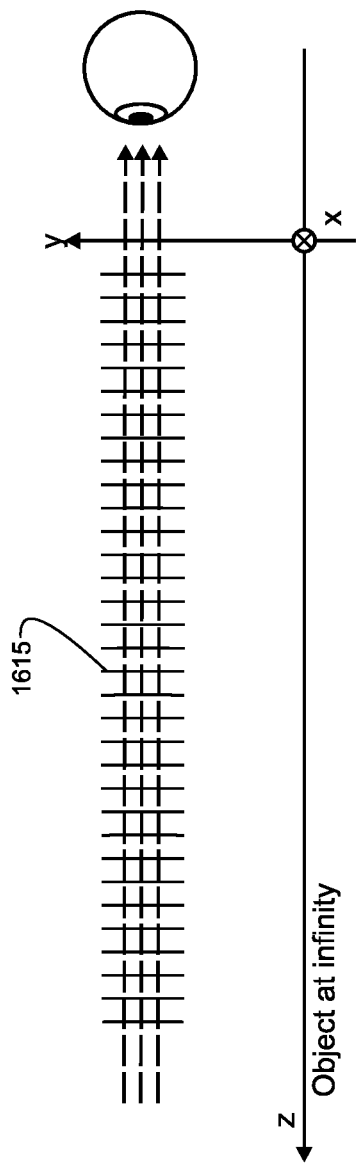 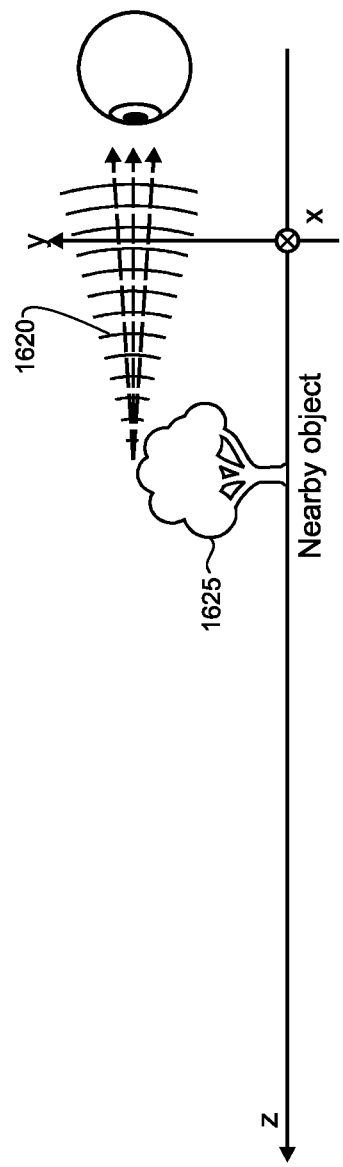
FIG 16A
FIG 16B
FIG 16C

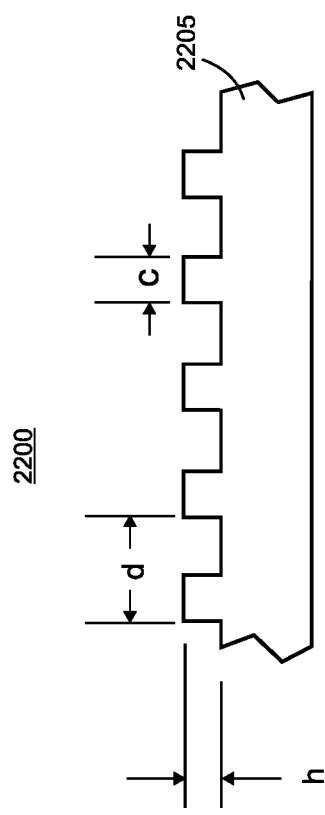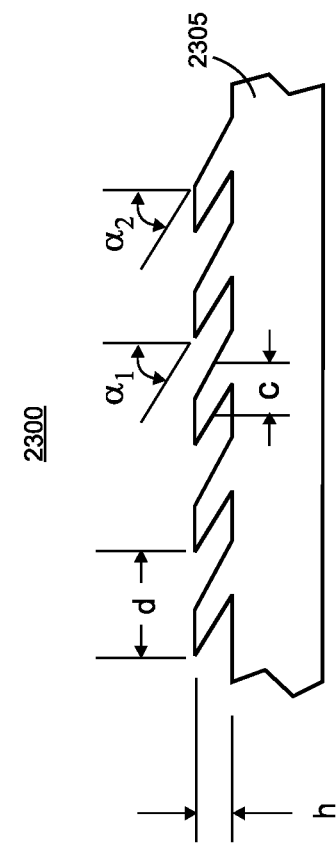
FIG 22
FIG 23

GLINT-BASED EYE TRACKER ILLUMINATION USING DUAL-SIDED AND DUAL-LAYERED ARCHITECTURES

STATEMENT OF RELATED APPLICATIONS

This application is a continuation of U.S. application Ser. No. 17/322,800, filed May 17, 2021, entitled, "GLINT-BASED EYE TRACKER ILLUMINATION USING DUAL-SIDED AND DUAL-LAYERED ARCHITECTURES", incorporated herein by reference in its entirety.

BACKGROUND

In a wearable device such as a head-mounted display (HMD) device, tracking the positions of the eyes of a device user can enable estimation of the direction of the user's gaze. Gaze direction can be used as an input to various programs and applications that control the display of images on the HMD devices, among other functions. To determine the position and gaze of the user's eyes, an eye tracker may be incorporated into the HMD device.

SUMMARY

In a see-through waveguide-based HMD device configured to display holographic virtual images within a field of view (FOV) of a device user, a glint-based eye tracker illumination system provides infrared (IR) point sources at known locations having a predetermined angular distribution using optical components—including input and output couplers and diffusers—on a waveguide that is located in front of the user's eyes. The IR point sources are reflected from the user's eyes and captured by one or more sensors in an eye tracker. The eye tracker may apply real-time image analysis to the captured reflected light, called "glints," to extract features of the user's eyes to determine where the user is looking—the gaze point—and calculate eye movement, location, and orientation.

An input coupler couples light from an IR illumination source into the illumination system waveguide which is propagated to one or more output couplers. Separate diffuser elements aligned with the output couplers distribute the out-coupled IR light into a deterministic range of divergent angles to function as IR point sources for eye tracker glints that are located at the surface of the diffuser substrate in the plane of the waveguide. Separating the out-coupling and diffuser functions into separate discrete components advantageously enables the light-handling efficiency of the components to be optimized to minimize wasted light. As the diffusers only need to function within a relatively narrow angular range along the direction of propagation to provide the IR point sources, design complexity is reduced which may ease manufacturing tolerances and lower component costs.

Various illustrative illumination system waveguide architectures are disclosed in which the optical components can be disposed on the same or opposite sides of the waveguide. The optical components can be diffractive optical elements (DOEs) using surface relief grating features that may be directly fabricated into the substrate of the waveguide or fabricated using features that are molded into resins that are disposed on one or more sides of the waveguides. Resin layers can be disposed on the waveguide to implement dual-layered and dual-sided architectures in which the optical components are respectively located on the same and opposite sides of the waveguide.

A negative lens functionality may also be directly incorporated into a diffractive optical element (DOE) or be combined with out-coupling functionality in an output coupler. The negative lens functionality may be implemented using linear grating pitch and curvature modulation to impart diverging spherical wavefronts to the out-coupled IR eye tracker illumination to place the virtual focal point, for example, below the surface of the component substrate.

Unlike conventional fixed illumination sources, the eye tracker illumination system can provide granular control of individual IR point sources at any location in the FOV of the HNMD device display to provide for a flexible and adaptable illumination source geometry. Illumination patterns for IR point sources may be dynamically varied, either temporally, spatially, or both for example, to facilitate tuning, adjustment, or calibration of the eye tracker on a per-device or per-user basis. The IR point sources may also be variably located in the FOV to accommodate individual user's physiological characteristics such as interpupillary distance, etc.

Implementing IR point sources for eye tracker illumination using dual-sided and/or dual-layered waveguide-based architectures may provide significant technical advantages. Eye tracking may be more performant and efficient by placing IR point sources in the FOV of the display directly in front of the eyes. In particular, the angular orientation of the IR point sources relative to the eye tracking sensors may be advantageously optimized for utilization and analyses by the image analysis algorithms underlying the eye tracking, for example, which may result in shorter algorithmic integration intervals or more accurate tracking.

Conventional illumination sources are typically located around the periphery of the display in fixed positions due to device packaging, ergonomic, and industrial design considerations. The IR point sources, by contrast, can be readily integrated into both existing and new HMD device designs while enabling variable and dynamic positioning of eye tracker illumination sources. Eliminating the use of conventional illumination sources and the associated peripheral wiring and componentry can reduce complexity and parts count to thereby improve reliability of the eye tracker and lower costs.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

FIGS. 15A, 15B, and 15C show illustrative paths of light rays that are respectively associated with a distant object, an object at infinity, and a nearby object;

FIGS. 16A, 16B, and 16C show illustrative partially spherical wavefronts that are respectively associated with a distant object, an object at infinity, and a nearby object;

FIG. 22 shows a profile of a portion of an illustrative diffraction grating that has straight gratings;

FIG. 23 shows an asymmetric profile of a portion of an illustrative diffraction grating that has asymmetric or slanted gratings;

Like reference numerals indicate like elements in the drawings. Elements are not drawn to scale unless otherwise indicated.

DETAILED DESCRIPTION

Developing eye-tracking systems for HMD (head-mounted display) devices may present a number of technical and practical problems. Eye-tracking systems can add weight, involve large optical components, and require extra processing power. For certain eye tracking algorithms, it may be beneficial as far as accuracy, robustness, and/or speed for the eye tracking illumination source to be directly in front of the eye. Direct illumination, however, would block the user's line of sight. This is typically undesirable, in particular, in the case of a see-through display. One way to overcome this line-of-sight obstruction is to use one or more partially reflective (spectrally selective or spectrally neutral) mirrors to redirect the illumination to the eye. This approach, however, relies on potentially large optical components.

The inventors have recognized that conventional eye-tracking systems may add extraneous bulk, weight, and design complications to the devices for which they are engineered. Optical complications may arise for the user and installing eye-tracking systems in display devices such as head-mounted display (HMD) devices may add bulk and weight to the devices, particularly where reflective mirrors are utilized to get around line-of-sight obstructions. Optimizing a user's viewing experience while also providing an efficient and effective design for eye-tracking is a target for engineers that often involves trade-offs. In response to these issues, the present systems and methods described herein have been developed to provide an evolved design for use in HMD devices and other applications that utilize eye-tracking.

Figure 1:
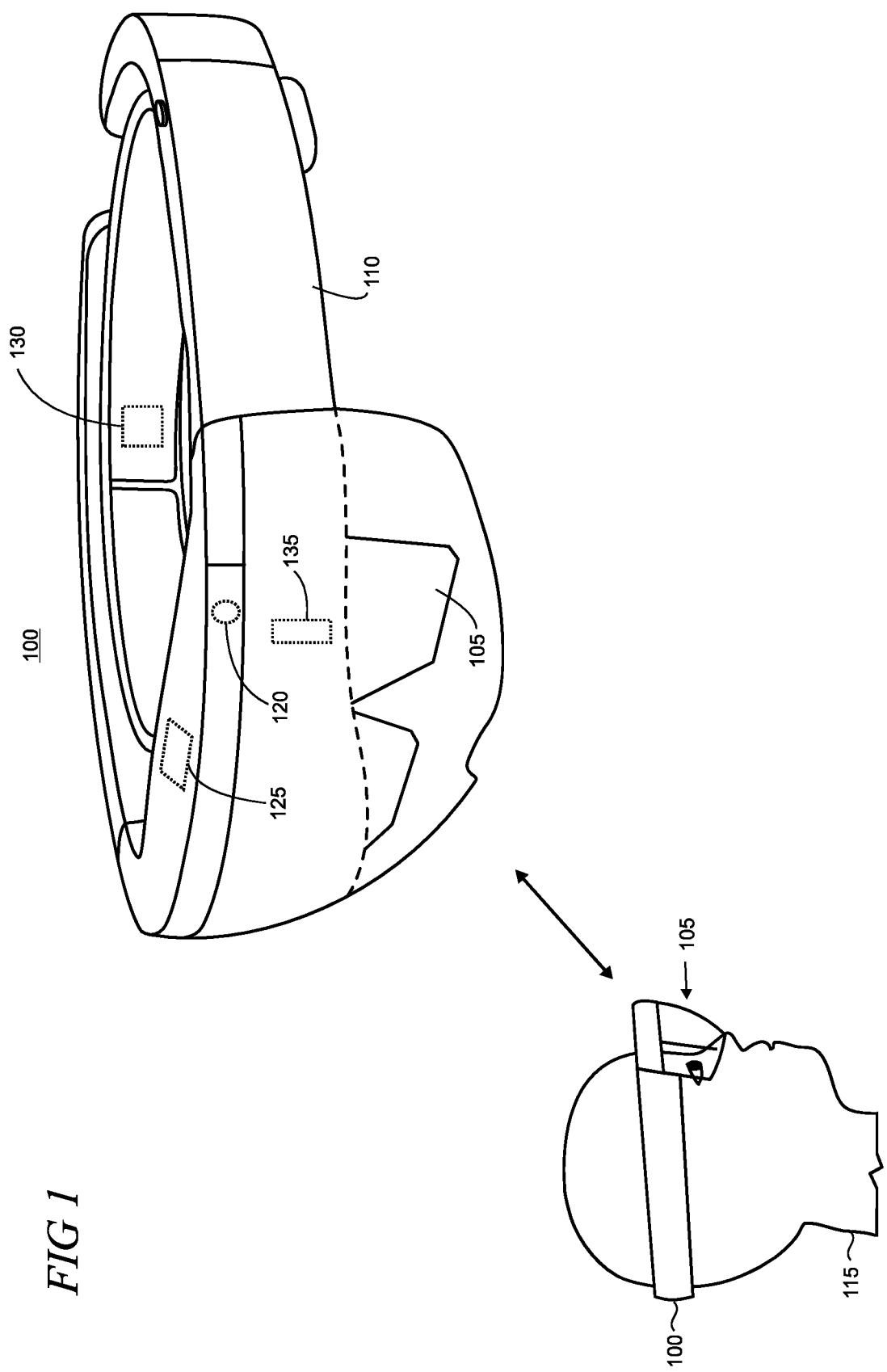
FIG. 1 shows a pictorial partially cutaway view of an illustrative HMD device that is configured with the present glint-based eye tracker illumination.

Turning now to the drawings, FIG. 1 shows a pictorial partially cutaway view of an illustrative HMD device 100 that is configured with the present glint-based eye tracker illumination. In this example, the HMD device includes a display device 105 and a frame 110 that wraps around the head of a user 115 to position the display device near the user's eyes to provide a virtual-reality or mixed-reality experience to the user.

Any suitable technology and configuration may be used to display images using the display device. For example, for a virtual-reality experience, the display device may be an opaque light-emitting diode (LED) display, a liquid crystal display (LCD), a micro-electromechanical system (MEMS) scanner, or any other suitable type of opaque display device. In some implementations, outward facing cameras 120 may be provided that capture images of the surrounding physical environment, and these captured images may be rendered on the display device 105 along with computer-generated virtual images that augment the captured images of the physical environment.

For a mixed-reality experience, the display device 105 may be see-through so that the user of the HMD device 100 can view physical, real-world objects in the physical environment over which pixels for virtual objects are overlayed. For example, the display device may include one or more partially transparent waveguides used in conjunction with a virtual image source such as, for example, a microdisplay comprising RGB (red, green, blue) LEDs, an organic LED (OLED) array, liquid crystal on silicon (LCoS) device, and/or MEMS device, or any other suitable displays or microdisplays operating in transmission, reflection, or emission. The virtual image source may also include electronics such as processors, optical components such as mirrors and/or lenses, and/or mechanical and other components that enable a virtual display to be composed and provide one or more input optical beams to the display system. Virtual image source may be referred to as light or display engines in some contexts.

The frame 110 may further support additional components of the HMD device 100, including a processor 125, an inertial measurement unit (IMU) 130, and an eye tracker 135. The processor may include logic and associated computer memory configured to receive sensory signals from the IMU and other sensors, to provide display signals to the display device 105, to derive information from collected data, and to enact various control processes described herein.

The display device 105 may be arranged in some implementations as a near-eye display. In a near-eye display the virtual image source does not actually shine the images on a surface such as a glass lens to create the display for the user. This is not feasible because the human eye cannot focus on something that is that close. Rather than create a visible image on a surface, the near-eye display uses an optical system to form a pupil and the user's eye acts as the last element in the optical chain and converts the light from the pupil into an image on the eye's retina as a virtual display. It may be appreciated that the exit pupil is a virtual aperture in an optical system. Only rays which pass through this virtual aperture can exit the system. Thus, the exit pupil describes a minimum diameter of the holographic virtual image light after leaving the display system. The exit pupil defines the eyebox which comprises a spatial range of eye positions of the user in which the holographic virtual images projected by the display device are visible.

Figure 2:
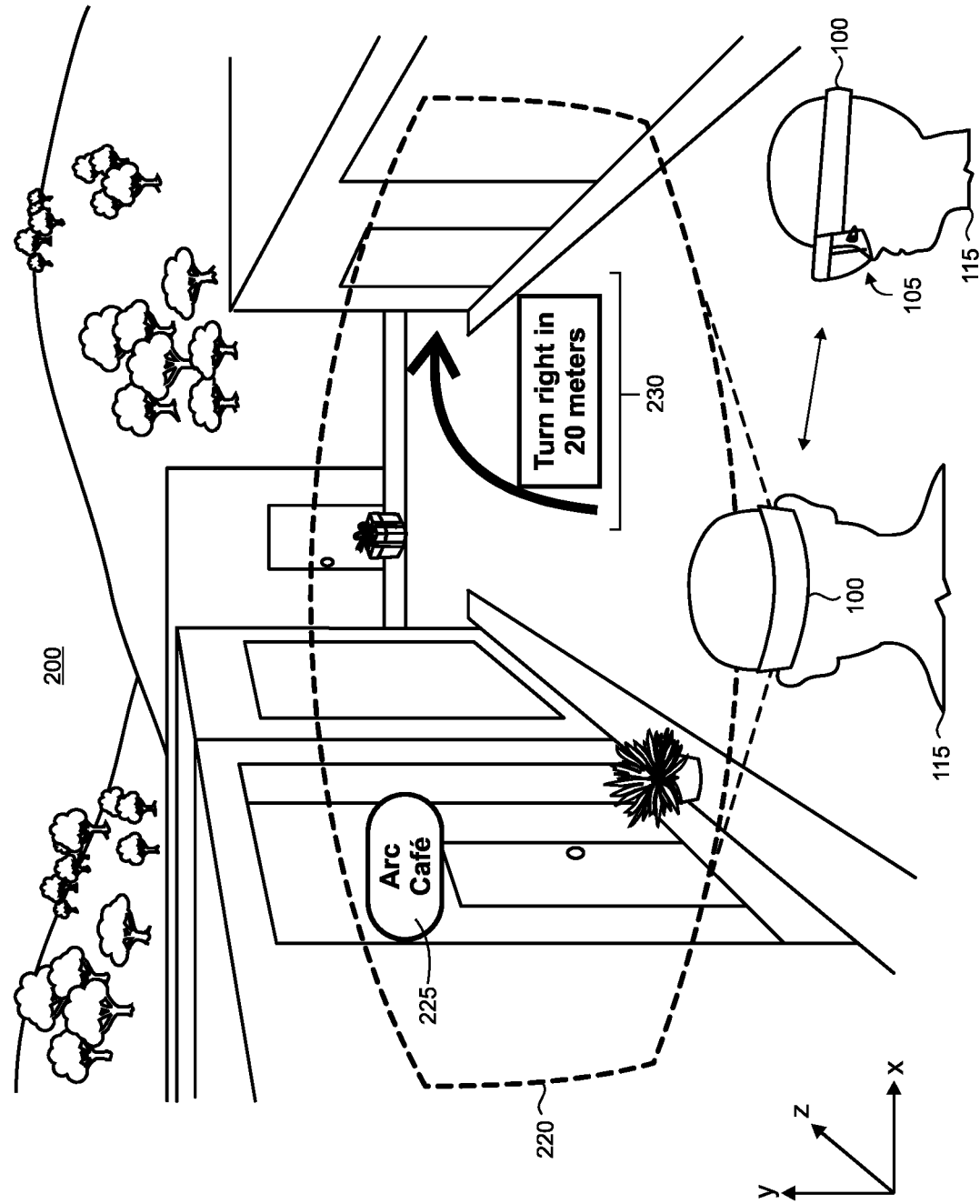
FIG. 2 illustratively shows holographic virtual images that are overlayed onto real-world images within a field of view (FOV) of a mixed-reality head-mounted display (HMD) device.

FIG. 2 shows the HMD device 100 worn by a user 115 as configured for mixed-reality experiences in which the display device 105 is configured as a near-eye display system having at least a partially transparent, see-through waveguide, among various other components, and may be further adapted to provide IR point sources in accordance with the principles discussed herein. As noted above, a virtual image source (not shown) generates holographic virtual images that are guided by the waveguide in the display device to the user. Being see-through, the waveguide in the display device enables the user to perceive light from the real world.

The see-through waveguide-based display device 105 can render holographic images of various virtual objects that are superimposed over the real-world images that are collectively viewed using the see-through waveguide display to thereby create a mixed-reality environment 200 within the HMD device's FOV (field of view) 220. It is noted that the FOV of the real world and the FOV of the holographic images in the virtual world are not necessarily identical, as the virtual FOV provided by the display device is typically a subset of the real FOV. FOV is typically described as an angular parameter in horizontal, vertical, or diagonal dimensions.

It is noted that FOV is just one of many parameters that are typically considered and balanced by HMD device designers to meet the requirements of a particular implementation. For example, such parameters may include eye-box size, brightness, transparency and duty time, contrast, resolution, color fidelity, depth perception, size, weight, form-factor, and user comfort (i.e., wearable, visual, and social), among others.

In the illustrative example shown in FIG. 2, the user 115 is physically walking in a real-world urban area that includes city streets with various buildings, stores, etc., with a countryside in the distance. The FOV of the cityscape viewed on HMD device 100 changes as the user moves through the real-world environment and the device can render static and/or dynamic virtual images over the real-world view. In this illustrative example, the holographic virtual images include a tag 225 that identifies a restaurant business and directions 230 to a place of interest in the city. The mixed-reality environment 200 seen visually on the waveguide-based display device may also be supplemented by audio and/or tactile/haptic sensations produced by the HMD device in some implementations.

During natural viewing, the human visual system relies on multiple sources of information, or "cues," to interpret three-dimensional shapes and the relative positions of objects. Some cues rely only on a single eye (monocular cues), including linear perspective, familiar size, occlusion, depth-of-field blur, and accommodation. Other cues rely on both eyes (binocular cues), and include vergence (essentially the relative rotations of the eyes required to look at an object) and binocular disparity (the pattern of differences between the projections of the scene on the back of the two eyes).

To view objects clearly, humans must accommodate, or adjust their eyes' focus, to the distance of the object. At the same time, the rotation of both eyes must converge to the object's distance to avoid seeing double images. In natural viewing, vergence and accommodation are linked. When viewing something near (e.g., a housefly close to the nose) the eyes cross and accommodate to a near point. Conversely, when viewing something at optical infinity, the eyes' lines of sight become parallel, and the eyes' lenses accommodate to infinity.

In typical HMD devices, users will always accommodate to the focal distance of the display (to get a sharp image) but converge to the distance of the object of interest (to get a single image). When users accommodate and converge to different distances, the natural link between the two cues must be broken and this can lead to visual discomfort or fatigue. Accordingly, to maximize the quality of the user experience and comfort with the HMD device 100, virtual images may be rendered in a plane to appear at a constant distance from the user's eyes. For example, virtual images, including the images 225 and 230, can be set at a fixed depth (e.g., 1 m) from the user 115. Thus, the user will always accommodate near 1 m to maintain a clear image in the HMD device. It may be appreciated that 1 m is an illustrative distance and is intended to be non-limiting. Other fixed depth distances may be utilized to meet requirements of specific applications of virtual- and mixed-reality HMD devices.

Figure 3:
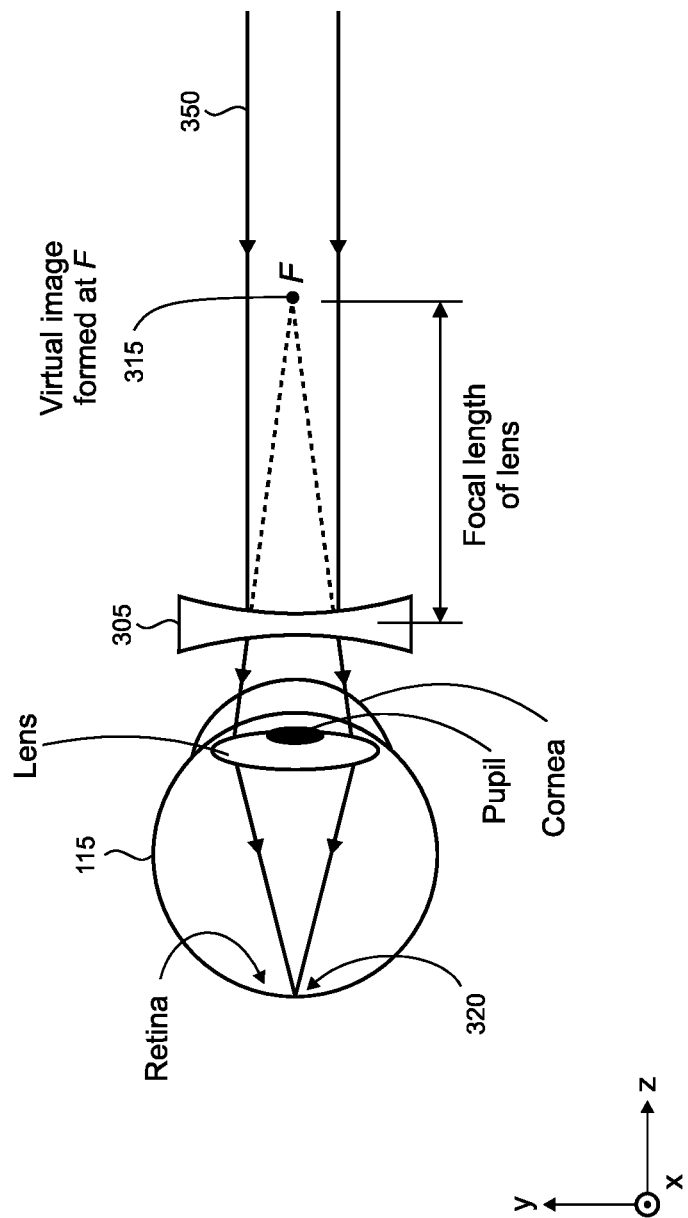
FIG. 3 shows an illustrative negative lens that provides for a virtual image that is located at a focal point of the lens.

Various approaches may be utilized to render virtual images with the suitable divergent angles to thereby appear at the targeted depth of focus. For example, FIG. 3 shows that a negative (i.e., concave) lens 305 can diverge the collimated/parallel rays 350 that are received from a conventional output coupler element (not shown) in an HMD device to produce a holographic virtual image having a location that is apparent to the user at a focal point, F (as indicated by reference numeral 315), that is determined by the focal length of the lens (e.g., 0.5 m, 1 m, 2 m, etc.). The rays from the negative lens arriving at the user's eye are non-parallel and divergent, as shown, and converge using the eye's internal lens to form the image on the retina, as indicated by reference numeral 320.

Figure 4:
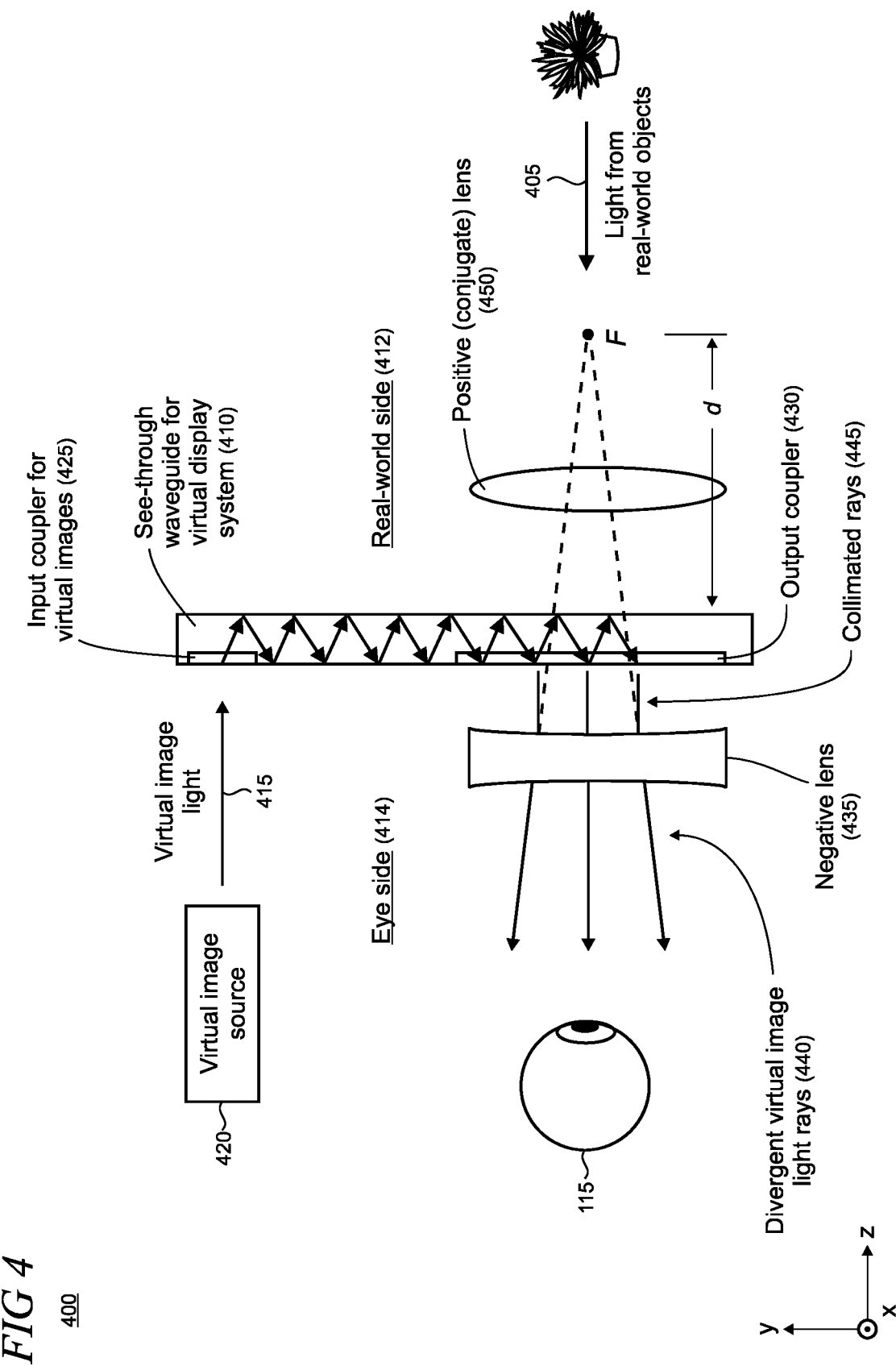
FIG. 4 shows a simplified side view of an illustrative virtual display system that includes a waveguide-based optical combiner that may be used in an HMD device.

FIG. 4 shows a simplified side view of an illustrative virtual display system 400 that is incorporated into the display device 105 (FIG. 1) and which may be used in the HMD device 100 to render virtual images. The virtual display system may function as an optical combiner by superimposing the rendered virtual images over the user's view of light from real-world objects 405 to thus form the augmented reality display.

Figure 24:
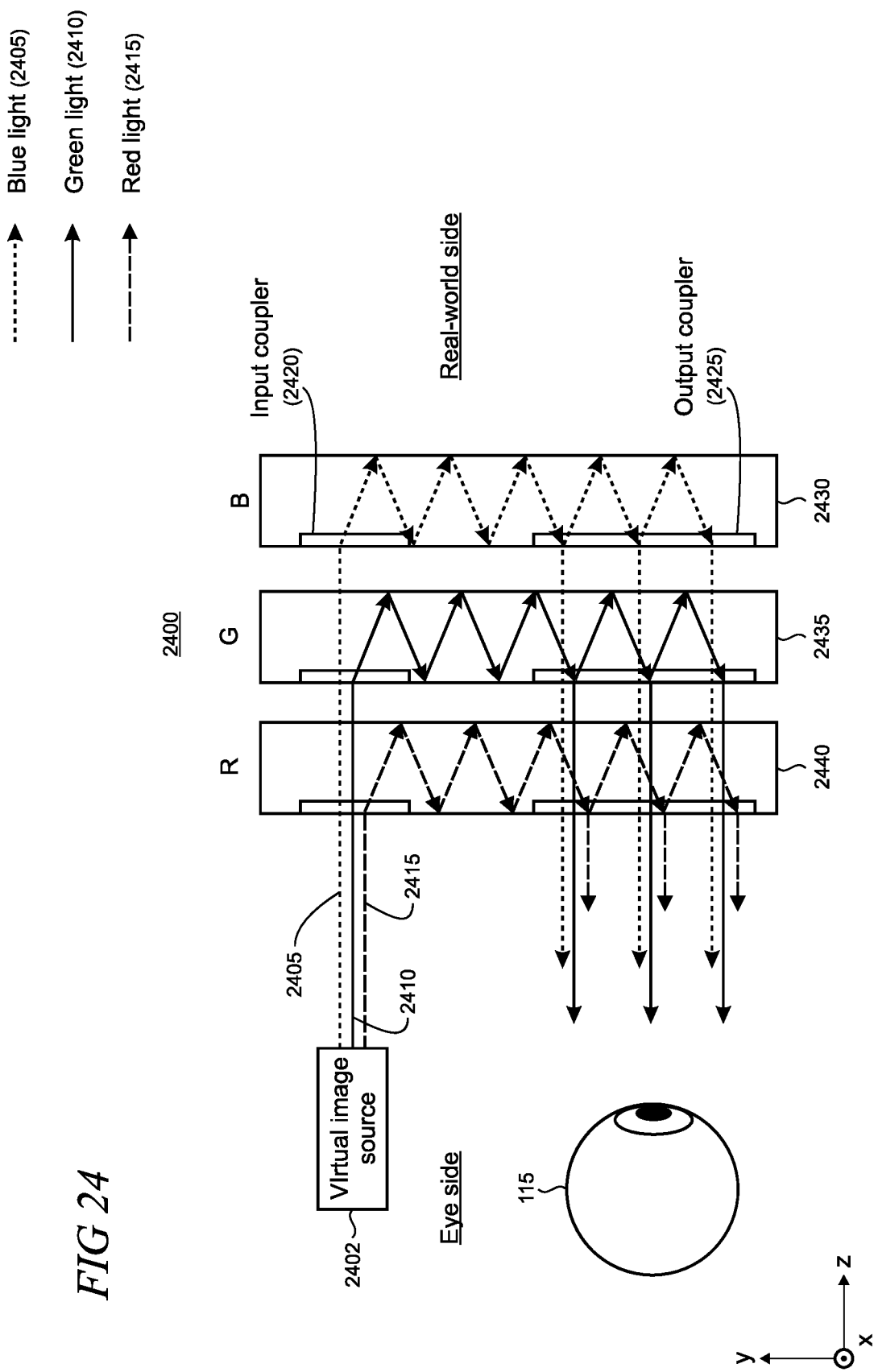
FIG. 24 shows a side view of an illustrative assembly of three waveguides with integrated coupling elements that are stacked to form an optical combiner, in which each waveguide handles a different color in an RGB (red, green, blue) color model.

The display system is adapted in this example to work with a glint-based eye tracker illumination system to provide illumination that may be used by an eye tracker (not shown), as discussed in more detail below. The display system includes at least one partially transparent (i.e., see-through) waveguide 410 that is configured to propagate visible light. While a single waveguide is shown in FIG. 4 for sake of clarity in exposition of the present principles, it will be appreciated that a plurality of waveguides may be utilized in some applications, as shown in FIG. 24 and described in the accompanying text below.

The waveguide 410 facilitates light transmission between the virtual image source and the eye. One or more waveguides can be utilized in the near-eye display system because they are transparent and because they are generally small and lightweight. This is desirable in applications such as HMD devices where size and weight are generally sought to be minimized for reasons of performance and user comfort. Use of the waveguide 410 can enable the virtual image source to be located out of the way, for example, on the side of the user's head or near the forehead, leaving only a relatively small, light, and transparent waveguide optical element in front of the eyes.

In an illustrative implementation, the waveguide 410 operates using a principle of total internal reflection (TIR) so that light can be coupled among the various optical elements in the HMD device 100. TIR is a phenomenon which occurs when a propagating light wave strikes a medium boundary (e.g., as provided by the optical substrate of a waveguide) at an angle larger than the critical angle with respect to the normal to the surface. In other words, the critical angle ($\theta_c$) is the angle of incidence above which TIR occurs, which is given by Snell's Law, as is known in the art. More specifically, Snell's law states that the critical angle ($\theta_c$) is specified using the following equation:

$$\theta_c = \sin^{-1}(n2/n1)$$

where $\theta_c$ is the critical angle for two optical mediums (e.g., the waveguide substrate and air or some other medium that is adjacent to the substrate) that meet at a medium boundary, n1 is the index of refraction of the optical medium in which light is traveling towards the medium boundary (e.g., the waveguide substrate, once the light is coupled therein), and n2 is the index of refraction of the optical medium beyond the medium boundary (e.g., air or some other medium adjacent to the waveguide substrate).

The user 115 can look through the waveguide 410 to see real-world objects on the real-world side of the display device 105 (the real-world side is indicated by reference numeral 412 in FIG. 4). For the virtual part of the FOV of the display system, virtual image light 415 is provided by a virtual image source 420 (e.g., a virtual image source or light engine, etc.). The virtual image light is in-coupled to the waveguide by an input coupler 425 and propagated through the waveguide in total internal reflection. The image light is out-coupled from the waveguide by an output coupler 430. The combination of see-through waveguide and coupling elements may be referred to as a mixed-reality optical combiner because it functions to combine real-world and virtual-world images into a single display.

Typically, in such waveguide-based optical combiners, the input pupil needs to be formed over a collimated field, otherwise each waveguide exit pupil will produce an image at a slightly different distance. This results in a mixed visual experience in which images are overlapping with different focal depths in an optical phenomenon known as focus spread. The collimated inputs and outputs in conventional waveguide-based display systems provide holographic virtual images displayed by the display device that are focused at infinity.

In some embodiments, the input coupler 425 and output coupler 430 may be configured as diffractive optical elements (DOEs). DOEs may comprise, for example, surface relief grating (SRG) structures and volumetric holographic grating (VHG) structures. An intermediate DOE (not shown) may also be disposed in the light path between the input coupler and output coupler in some cases. The intermediate DOE may be configured to provide exit pupil expansion in one direction (e.g., horizontal) while the output coupler may be configured to provide exit pupil expansion in a second direction (e.g., vertical).

In alternative embodiments, the optical combiner functionality provided by the waveguide and DOEs may be implemented using a reflective waveguide combiner. For example, partially reflective surfaces may be embedded in a waveguide and/or stacked in a geometric array to implement an optical combiner that uses partial field propagation. The reflectors can be half-tone, dielectric, holographic, polarized thin layer, or be fractured into a Fresnel element.

In other embodiments, the principles of the present glint-based eye tracker illumination may be implemented using a reflective waveguide combiner with any suitable in-coupling and/or out-coupling methods. A reflective waveguide combiner may utilize a single waveguide in some implementations for all colors in the virtual images which may be desirable in some applications. By comparison, diffractive combiners typically require multiple waveguides to meet a target FOV in polychromatic applications due to limitations on angular range that are dictated by the waveguide TIR condition.

The present glint-based eye tracker illumination may also be utilized with various other waveguide/coupling configurations beyond reflective and diffractive. For example, it may be appreciated that the principles of the present invention may be alternatively applied to waveguides that are refractive, polarized, hybrid diffractive/refractive, phase multiplexed holographic, and/or achromatic metasurfaces.

A negative lens 435 is located on the eye side of the waveguide 410 (the eye side is indicated by reference numeral 414 in FIG. 4). The negative lens acts over the entire extent of the eyebox associated with the user's eye to thereby create the diverging rays 440 from the collimated rays 445 that exit the output coupler 430. When the virtual image source 420 is operated to project virtual images that are in-coupled into the waveguide 410, the output diverging rays present the virtual images at a predetermined focal depth, d, from the display system at an apparent or virtual point of focus, F. For example, if the negative lens is configured with −0.5 diopters of optical power, then d is equal to 2 m.

To ensure that the user's view of the real world remains unperturbed by the negative lens, a conjugate positive (i.e., convex) lens 450 is located on the real-world side of the waveguide 410 to compensate for the impact of the negative lens on the eye side. The conjugate pair of positive and negatives lenses may be referred to as a push-pull lens pair in some contexts. In some applications, the functionality of the negative lens may be provided by a discrete standalone optical element. In other applications, one or more of the elements in the display device may be configured to incorporate the negative lens as an additional functionality. For example, the negative lens functionality can be integrated into the output coupler and/or waveguide in the display device using any suitable technique.

Different amounts of optical power may be utilized to provide for focal planes that are located at other distances to suit requirements of a particular application. The power of the negative lens 435 does not affect the zeroth diffraction order that travels in TIR down the waveguide 410 (i.e., from top to bottom in the drawings), but instead only the diffracted out-coupled field. In addition, the see-through field is not affected by the negative lens because whatever portion of the see-through field that is diffracted by the output coupler 430 is trapped by TIR in the waveguide and is therefore not transmitted to the user's eye.

Figure 5:
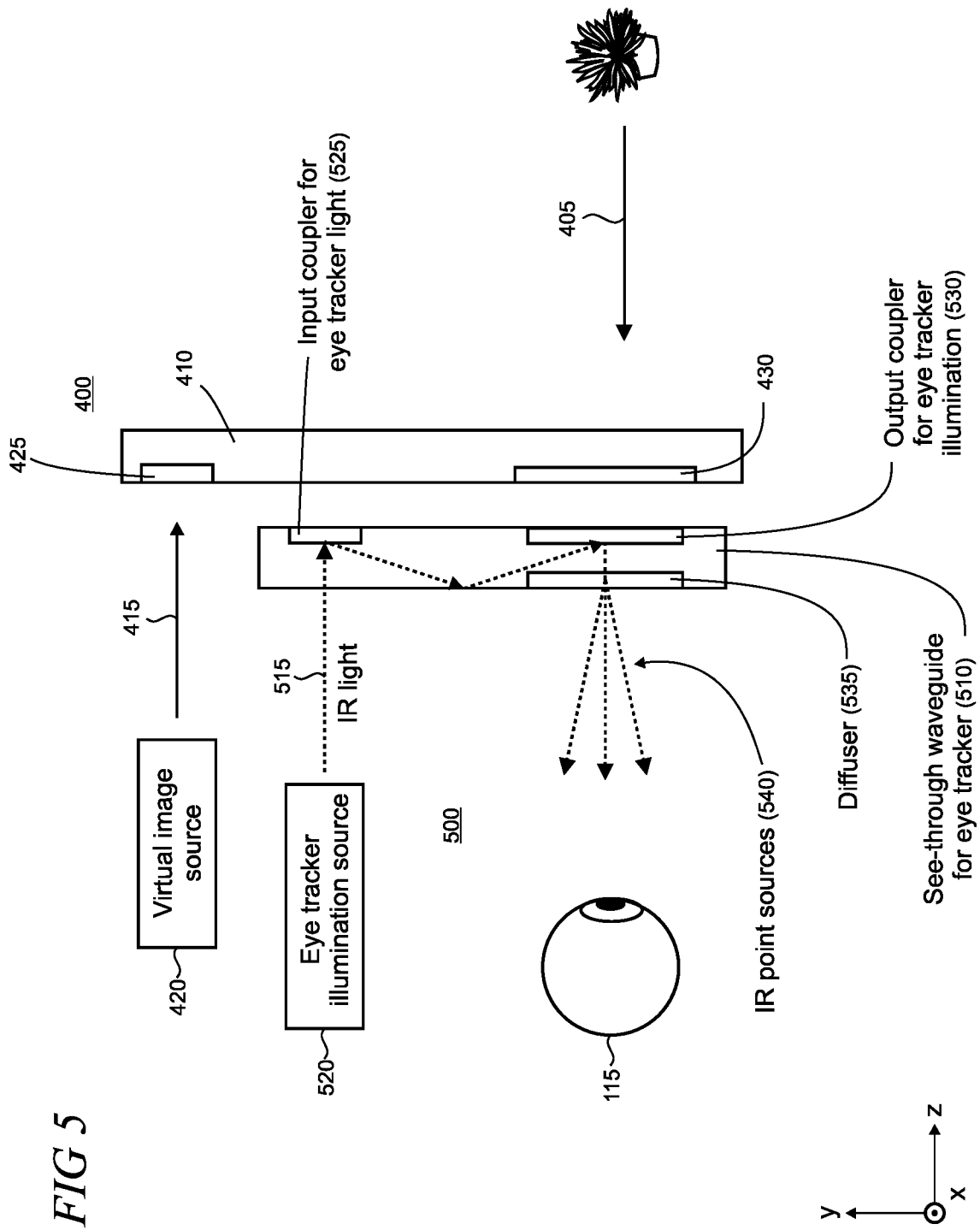
FIG. 5 shows a simplified side view of an illustrative eye tracker illumination system in operative combination with a virtual display system.

FIG. 5 shows a simplified side view of an illustrative eye tracker illumination system 500 in operative combination with a virtual display system 400. The conjugate pair of positive and negatives lenses are omitted from the drawing for sake of clarity. An eye tracker illumination source 520 which may comprise, for example, an infrared (IR) laser or one or more light emitting diodes (LEDs), provides one or more beams of IR light 515 to an input coupler 525 which in-couples the IR light into see-through waveguide 510 for the eye tracker system. In some implementations, the source may comprise light having wavelengths in the near-IR range, or other ranges. Typically, however, IR light may enable eye tracking with minimal impact on visibility of virtual and real world images through the display of the HMD device.

In some implementations of the present glint-based eye tracker, the IR light path may be embodied in its own discrete waveguide, for example, as shown in FIG. 5. Alternatively, in some implementations in which multiple waveguides or "plates" are utilized for the virtual display system using an RGB color model, the IR light path may utilize the same waveguide as for the red color component or may utilize another one or more suitable waveguides that handle other components of the color model. Such waveguide sharing arrangements between the illumination and display systems may provide satisfactory eye tracker performance over a usable distribution of angles in some cases.

The IR light beams 515 propagate in TIR in the waveguide 510 to an output coupler 530 that is configured to out-couple beams of IR light from the waveguide that function as glint sources for eye tracking. FIG. 5 shows an illustrative dual-sided illumination system architecture in which a diffuser 535 is disposed on the opposite side of the waveguide to that for the output coupler. The diffuser is adapted to spread the out-coupled beams of IR light into a suitable angular distribution to create one or more point sources 540.

The locations of the diffuser and the output coupler on the waveguide provide for IR point sources 540 that may be dynamically and variably located in front of the user's eye. That is, the variation can be in either dimensions of time, space, or both. The diffuser and output coupler are at least partially aligned or overlapping with the FOV of the display system 400 as shown in front view in FIG. 6. That is, the output coupler 430 of the display system and the output coupler 530 and diffuser 535 of the eye tracker illumination system 500 are co-axially aligned along the z axis. However, it is noted that illumination and display system waveguides and components thereon do not need to be completely aligned, as partial alignment may be usable in some cases so long as the IR point sources are located substantially in front of the user's eye. The amount of alignment or overlap between the eye tracker illumination and display systems can vary by implementation.

In this illustrative example, the IR point sources 540 can be dynamically spatially located at various positions within the FOV of the virtual image display system 400. For example, the eye tracker illumination source 520 may be configured with a beam steering mechanism (e.g., a microelectromechanical system (MEMS) or utilize another suitable technology to enable IR light to be in-coupled by the input coupler 525 with some spatial variability to thereby selectively provide IR light from different locations on the diffuser 535 for eye tracking. In alternative embodiments, the IR illumination source 520 may be configured as a pixelated source or as one or more fixed sources.

Figure 6:
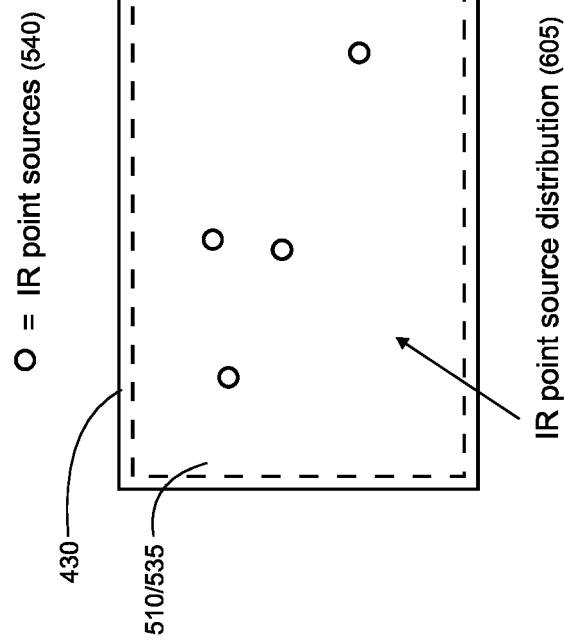
FIG. 6 provides a partial front view of an eye tracker illumination system waveguide in which IR point sources are located in front of the user's eye in the FOV of a virtual image display system.

It is noted than an arbitrary distribution 605 of IR point sources is shown in the illustrative example of FIG. 6. The IR points sources may be selectively lit to provide glints for tracking the user's eye. For example, the IR point sources may be arranged as a single discrete area of IR illumination, a group of adjacent areas, multiple non-adjacent areas, or some other contiguous or non-contiguous areas of IR light sources that are each bounded in some defined way.

It may be appreciated that the ability to light IR point sources at any location in the FOV of the display may provide highly flexible illumination patterns of IR light that can be expected to facilitate accurate and robust eye tracking.

The particular diffuser configuration and angular distribution of IR point sources that are utilized may be expected to vary according to individual application requirements and the configuration, type, and spatial deployment of the eye tracking sensors that are utilized in the eye tracking system. Processor capabilities and the image analysis and eye tracking methodologies used by the system can also be factors that may contribute to design choices for a given diffuser. It is noted that the dual-sided illumination system architecture shown in FIG. 5 is illustrative and that other architectures, as shown in FIGS. 9-14 and described in the accompanying text, may be optimally utilized to meet the requirements of a given implementation of the present glint-based eye tracking.

Figure 9:
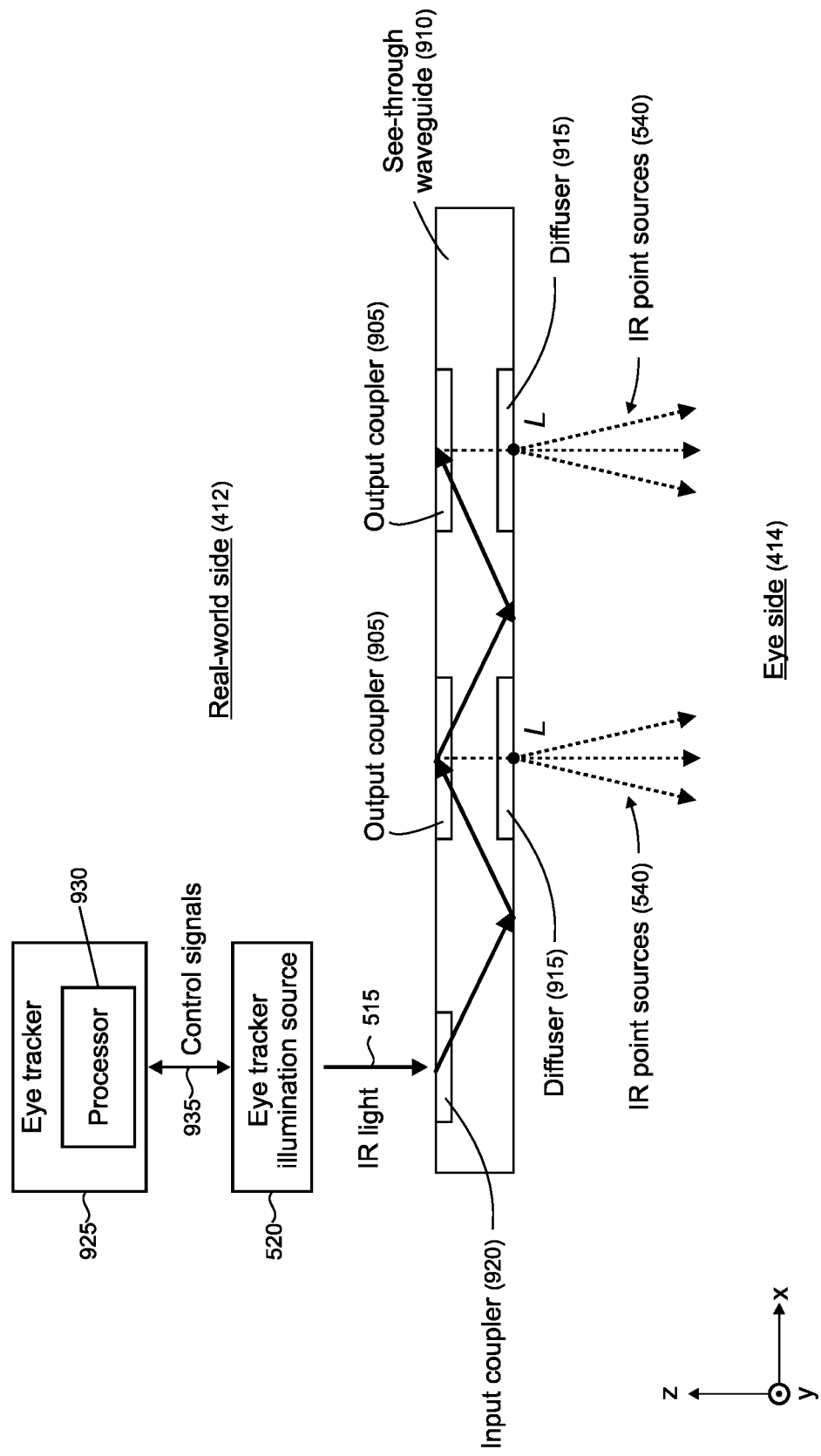
FIG. 9 shows a simplified top view of an illustrative example of a dual-sided eye tracker illumination system waveguide architecture in which output couplers and diffusers are located on opposite sides of a see-through waveguide.

The present glint-based eye tracker illumination system may interoperate with various functional elements of an eye tracking system that includes an eye tracker, as shown in FIG. 9 and discussed below, which executes eye tracking algorithms using the IR point sources 540. The interoperation may comprise coordination between operations of the eye tracker illumination source 520 and the eye tracker when respectively projecting IR light in the FOV as point sources and analyzing the glints using image processing to perform eye tracking.

Figure 7:
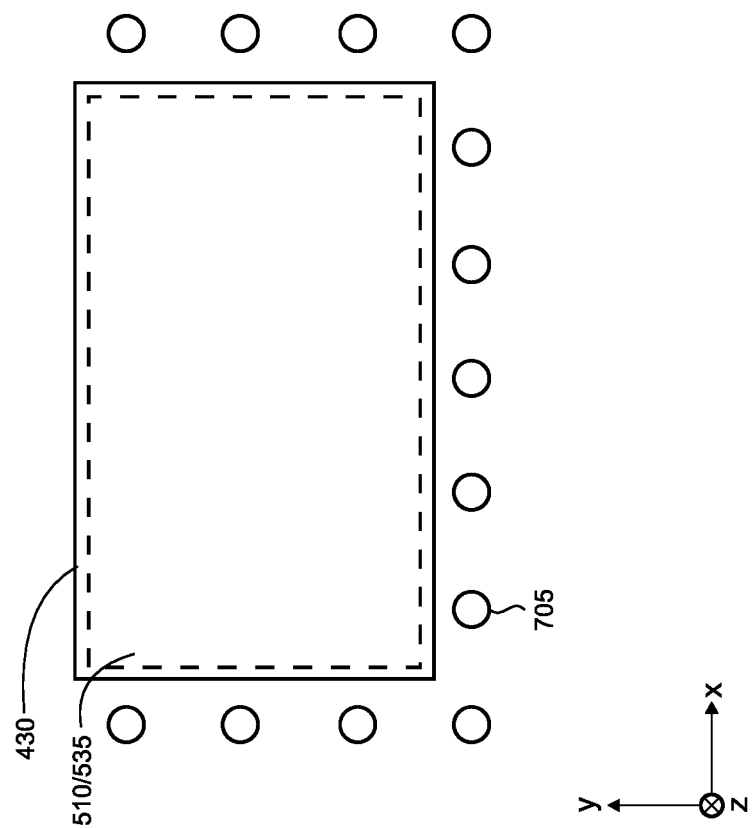
FIG. 7 provides a partial front view of an illustrative eye tracker illumination system waveguide in which eye tracker sensors are located around a periphery of a display region.

The eye tracking system may also include one or more sensors (as representatively indicated by reference numeral 705) or cameras that are typically located in various positions around the periphery of the diffuser 535, for example, as shown in FIG. 7. The sensors may be configured for sensitivity to glints reflected from features of the user's eyes in IR wavelengths.

Figure 8:
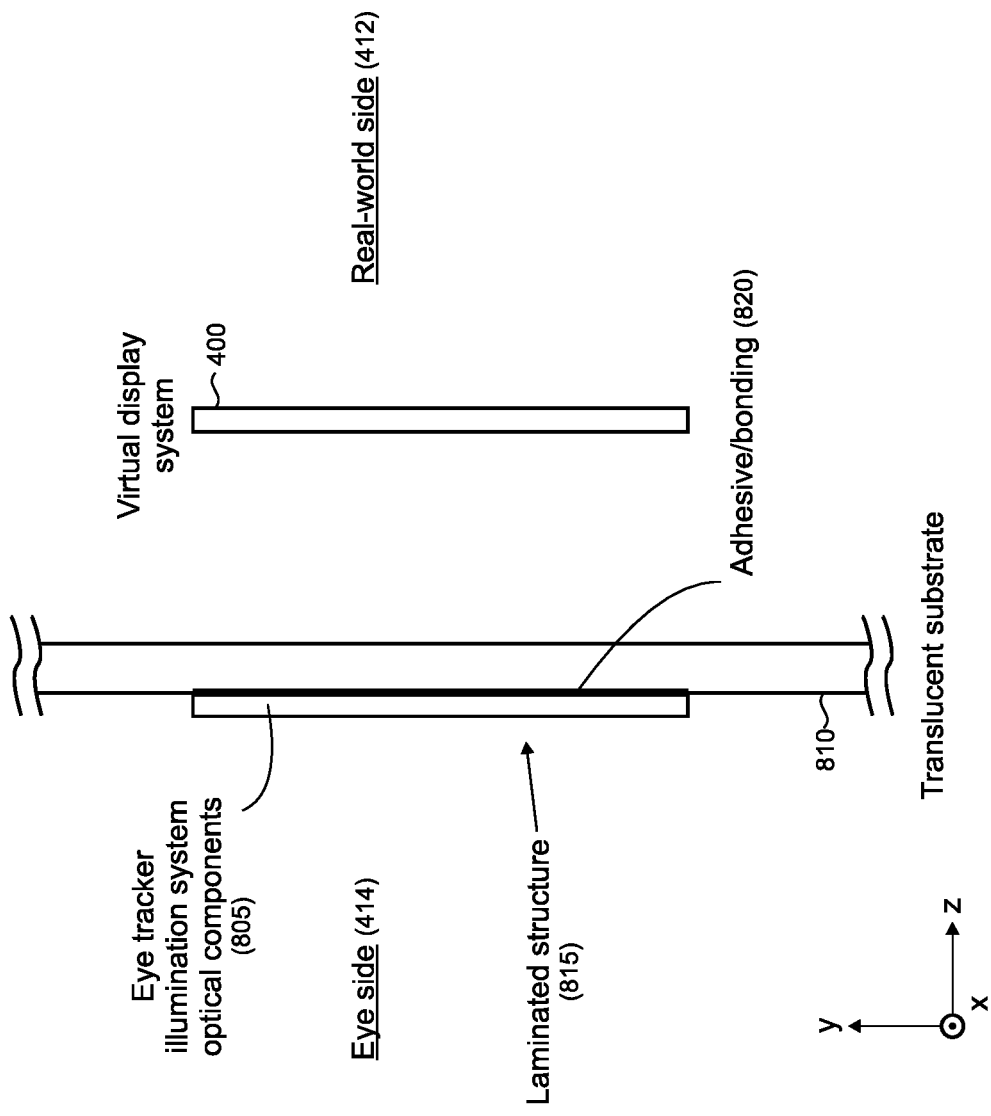
FIG. 8 shows a simplified side view of an illustrative eye tracker illumination system waveguide that is affixed to a translucent substrate such as glass or plastic to create a laminated structure.

The optical elements of the eye tracker illumination system 500 including the waveguide, input and output couplers, and diffuser may be implemented in a standalone configuration or be integrated into a waveguide plate of the virtual image display system, as discussed above. Another configuration alternative is depicted in FIG. 8. As shown, the optical components 805 of the eye tracking system may be affixed to a translucent substrate 810 to create a laminated structure 815. For example, a layer 820 of translucent adhesive or bonding agent may be utilized to create the structure.

The substrate 810 can take any suitable form and be configured from materials including plastics and glasses. For example, the substrate may be incorporated into an existing optical component of the HMD device 100 (FIG. 1) such as a lens, visor, or shield that may or may not be in the light propagation path of real-world light. In another example, all or portions of the substrate can be disposed on a non-optical (i.e., "dummy") component such as structural or non-structural component of the HMD device. In some implementations, utilization of the laminated structure 815 may permit more design flexibility of the HMD device and/or enhance functionality of the eye tracking system. For example, the substrate can help to maintain source and sensor geometry and enhance physical robustness of the system.

FIGS. 9-14 show illustrative examples of eye tracker illumination architectures, each of which is configured to receive IR light from an illumination source and provide a distribution of diverging output rays that function as IR point sources for eye tracking. It is noted that the examples are not limiting and that it may be appreciated that various combinations of the architectural features may be utilized to meet the requirements of particular applications of eye tracking illumination. It is further noted that the elements and components in the drawings are depicted to aid in clarity of exposition of the features and functions of the present glint-based eye tracker illumination. Elements and components are not drawn to scale and no particular spatial relationships are to be understood or inferred from the drawings except as explicitly stated in the text below.

FIG. 9 shows a simplified top view of an illustrative example of a dual-sided eye tracker illumination system waveguide architecture 900 in which output couplers 905 and diffusers 915 are located on opposite sides of a see-through waveguide 910. As shown, the output couplers are located on the real-world side 412 of the waveguide and the diffusers are located on the eye side 414 of the waveguide. An input coupler 920 is disposed on the waveguide on the same side (i.e., real-world side) as the output couplers.

In this illustrative example, the input coupler 920, output couplers 905, and diffusers 915 are directly incorporated into the substrate material of the waveguide using suitable fabrication techniques such as etching. The coupling components and diffusers may be configured as diffractive optical elements (DOEs) using linear grating functions. Slated gratings may be utilized to maximize in- and out-coupling efficiency in some applications to reduce wasted/unused light. Straight and slanted grating features are shown in FIGS. 22 and 23 and described in the accompanying text below.

The output couplers 905 and diffusers 915 are at least partially aligned along a propagation path of the out-coupled IR light on the z axis such that beams of IR light 515 from the eye tracker illumination source 520 are out-coupled from the output coupler to the respective diffusers. The number of input and output couplers and diffusers utilized in any given eye tracker illumination system waveguide architecture can vary by implementation and there may not necessarily be a one-to-one correspondence in component count between output couplers and diffusers.

The diffusers 915 are configured to spread the IR light out-coupled from the output couplers 905 in a suitable deterministic angular distribution to thereby function as IR point sources 540 to facilitate eye tracking. The diffusers 915 spread the IR light from the illumination source in an angular distribution from various locations L at or near the surface of the diffuser. In one exemplary embodiment, if the glints were visible, they would appear as point sources on the surface of the diffuser due to their relatively small size. That is, the IR point sources may be located in a plane that is parallel to the plane of the virtual display system.

The IR light from the diffusers 915 illuminates the user's eyes causing highly visible reflections, and the eye tracker sensors 705 (FIG. 7) capture an image of the eye showing these reflections. The images captured by the sensors are used to identify the reflection of the light source on the cornea (i.e., "glints") and in the pupil.

Typically, a vector formed by the angle between the cornea and pupil reflections may be calculated using real-time image analysis, and the vector direction combined with other geometrical features of the reflections is then used to determine where the user is looking—the gaze point—and calculate eye movement, location, and orientation. As noted above, by placing the IR point sources within the user's FOV using the present invention, the accuracy and robustness of eye tracking algorithms improves with a reduction in integration time. Particularly in HMD device designs having displays that are relatively close to the user's eye, for example, illumination sources may be more difficult for the eye tracking sensors to effectively utilize when the sources become more peripherally located. In some implementations, therefore, it may be advantageous for the angular distribution of the IR point sources (i.e., the illuminations system's FOV) to be smaller than the FOV of the display system. Such an arrangement may provide IR point sources that are more optimally located for eye tracking in some HMD designs.

An eye tracker 925 may be configured with a processor 930 to perform the image analysis and eye tracking using the captured reflections. As shown, the eye tracker is operatively coupled to the eye tracker illumination source 520 to provide control signals 935. For example, the illumination source may be controlled to selectively light IR pixels in different spatial locations within the FOV of the display system to provide IR point sources. The eye tracker may be further configured to operate one or more of the sensors 705 (FIG. 7) synchronously with the illumination source to capture images of reflections of the IR point sources from the user's cornea and/or pupil.

Figure 10:
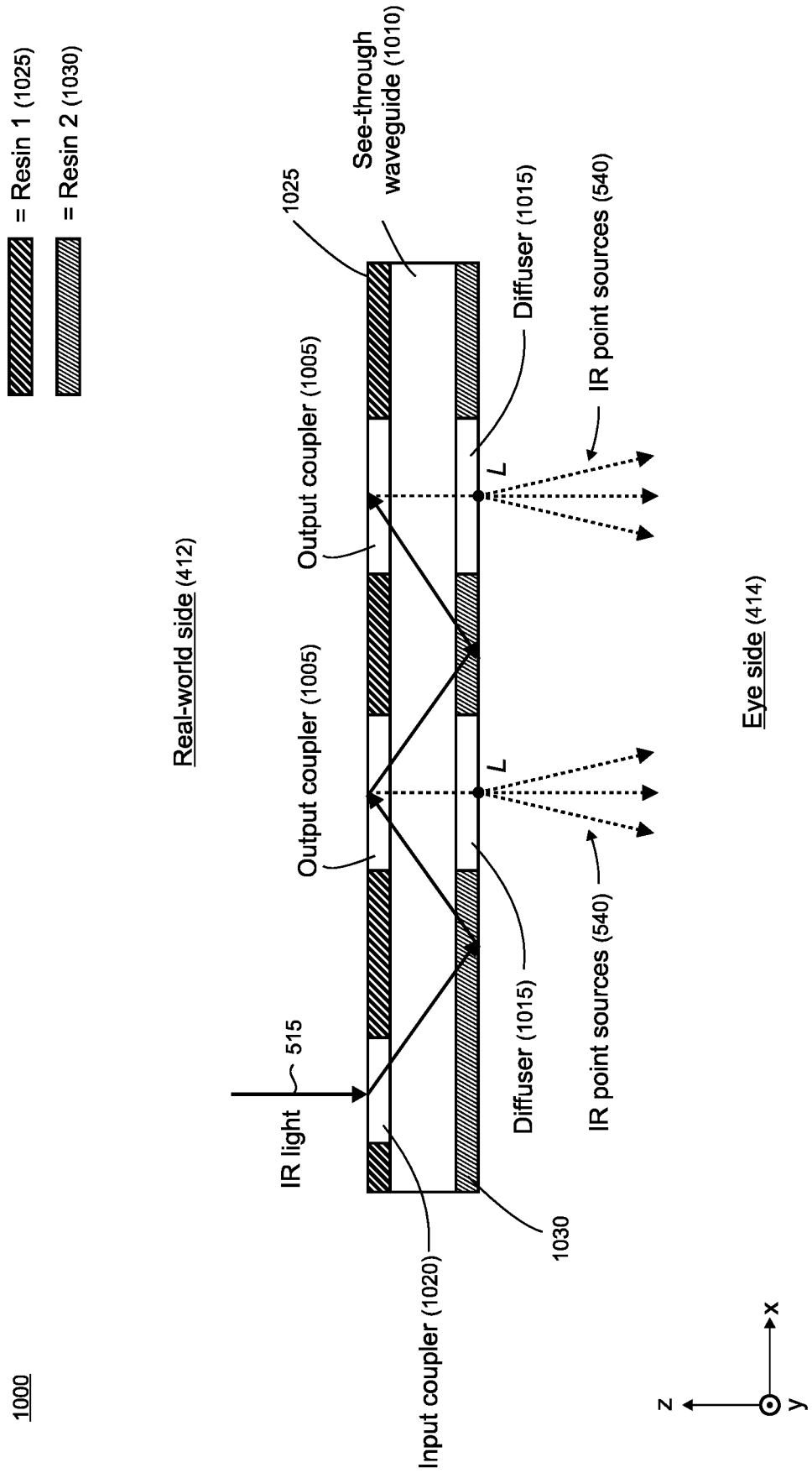
FIG. 10 shows a simplified top view of another illustrative example of a dual-sided eye tracker illumination system waveguide architecture in which output couplers and diffusers are located on opposite sides of a see-through waveguide.

FIG. 10 shows a simplified top view of an illustrative example of a dual-sided eye tracker illumination system waveguide architecture 1000 in which output couplers 1005 and diffusers 1015 are located on opposite sides of a see-through waveguide 1010. An input coupler 1020 is disposed on the waveguide on the same side (i.e., real-world side) as the output couplers in this illustrative example. However, it is noted that in all of the illustrative embodiments described herein, the input and output couplers can be alternatively disposed on the same side of the waveguide or on opposite sides depending on the particular requirements of a given implementation.

In this illustrative example, the light coupling components and diffusers may be implemented as DOEs that are formed in different layers of resins which are alternatively disposed on opposite sides of the substrate of the waveguide, as shown by reference numerals 1025 and 1030. A mold may then be applied to a resin layer which is cured by ultraviolet light prior to the mold being removed to reveal molded DOE features. The refractive indices of the two resins 1025 and 1030 and the waveguide substrate can be similar or different. Other than the fabrication techniques, the architectures 900 and 1000 in FIGS. 9 and 10 may be similar in form and functionality. As shown, the input and output couplers are molded in resin 1025 on the real-world side of the waveguide. The diffusers are molded in resin 1030 on the eye side of the waveguide. Suitable alternative fabrication methods may also be utilized in some implementations, for example, including laminating pre-fabricated grating patterns to the substrate.

Figure 11:
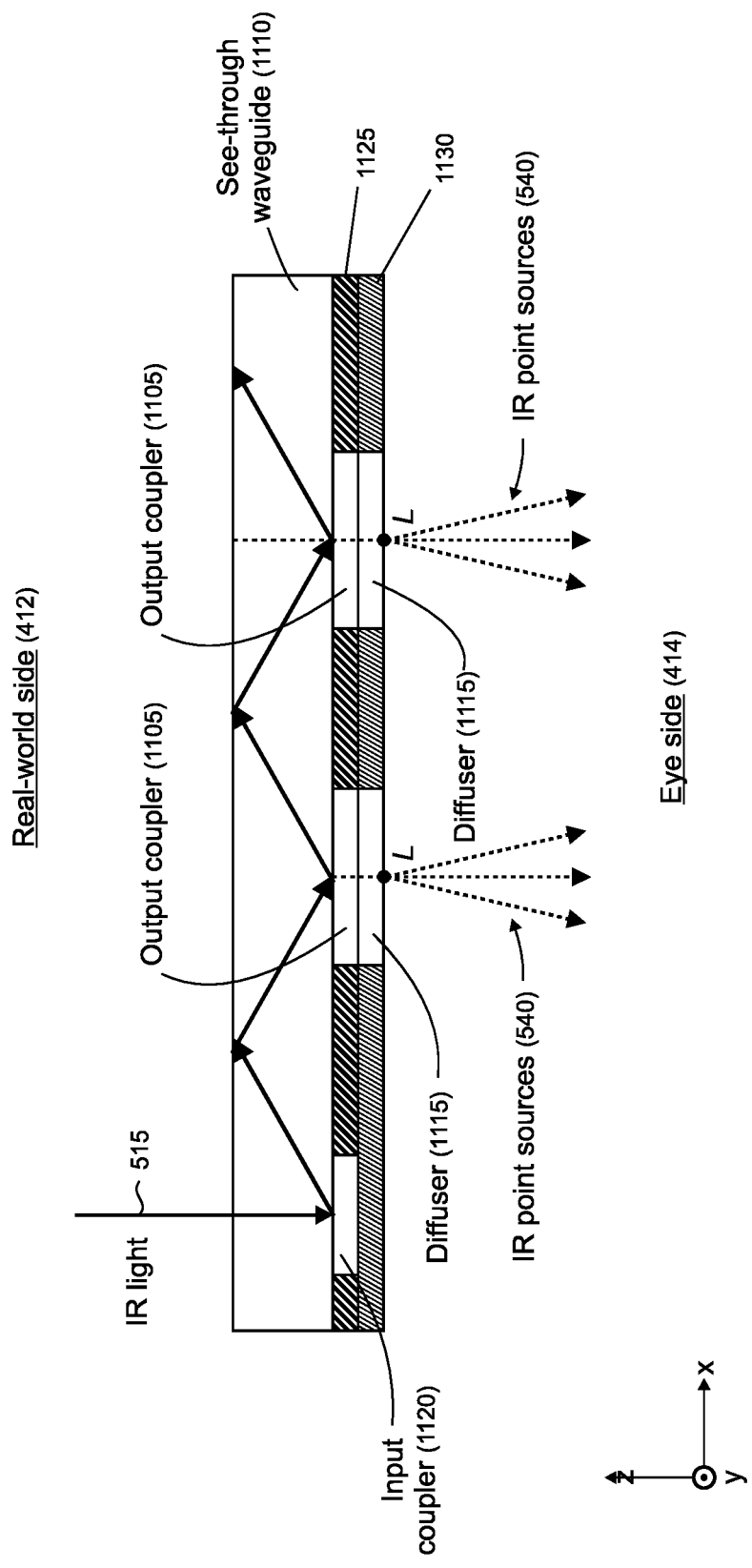
FIG. 11 shows a simplified top view of an illustrative example of a single-sided, dual-layered eye tracker illumination system waveguide architecture in which input and output couplers and diffusers are located on the same side of a see-through waveguide.

FIG. 11 shows a simplified top view of an illustrative example of a single-sided, dual-layered eye tracker illumination system waveguide architecture 1100 in which the input coupler 1120, output couplers 1105, and diffusers 1115 are located on the same side of a see-through waveguide 1110. In this illustrative example, the light coupling components and diffusers may be implemented as DOEs that are formed in different resins which are alternatively disposed in layers on the same side of the substrate of the waveguide, as shown by reference numerals 1125 and 1130. The refractive indices of the two resins in this illustrative example are different. In an alternative implementation, a first set of optical components may be fabricated directly into the substrate of the waveguide, and a second set of optical components may be molded into a layer of resin that is disposed on the waveguide. For example, the input and/or output couplers may be directly fabricated, and the diffusers may be molded, or vice versa.

As shown, the input coupler 1120 and output couplers 1105 are molded in resin 1125 on the real-world side of the waveguide 1110. The diffusers 1115 are molded in resin 1130 on the eye side of the waveguide. In an alternative embodiment, either the input or output couplers can be located on opposite sides of the waveguide so that a dual-sided, dual-layered architecture is implemented (not shown).

Figure 12:
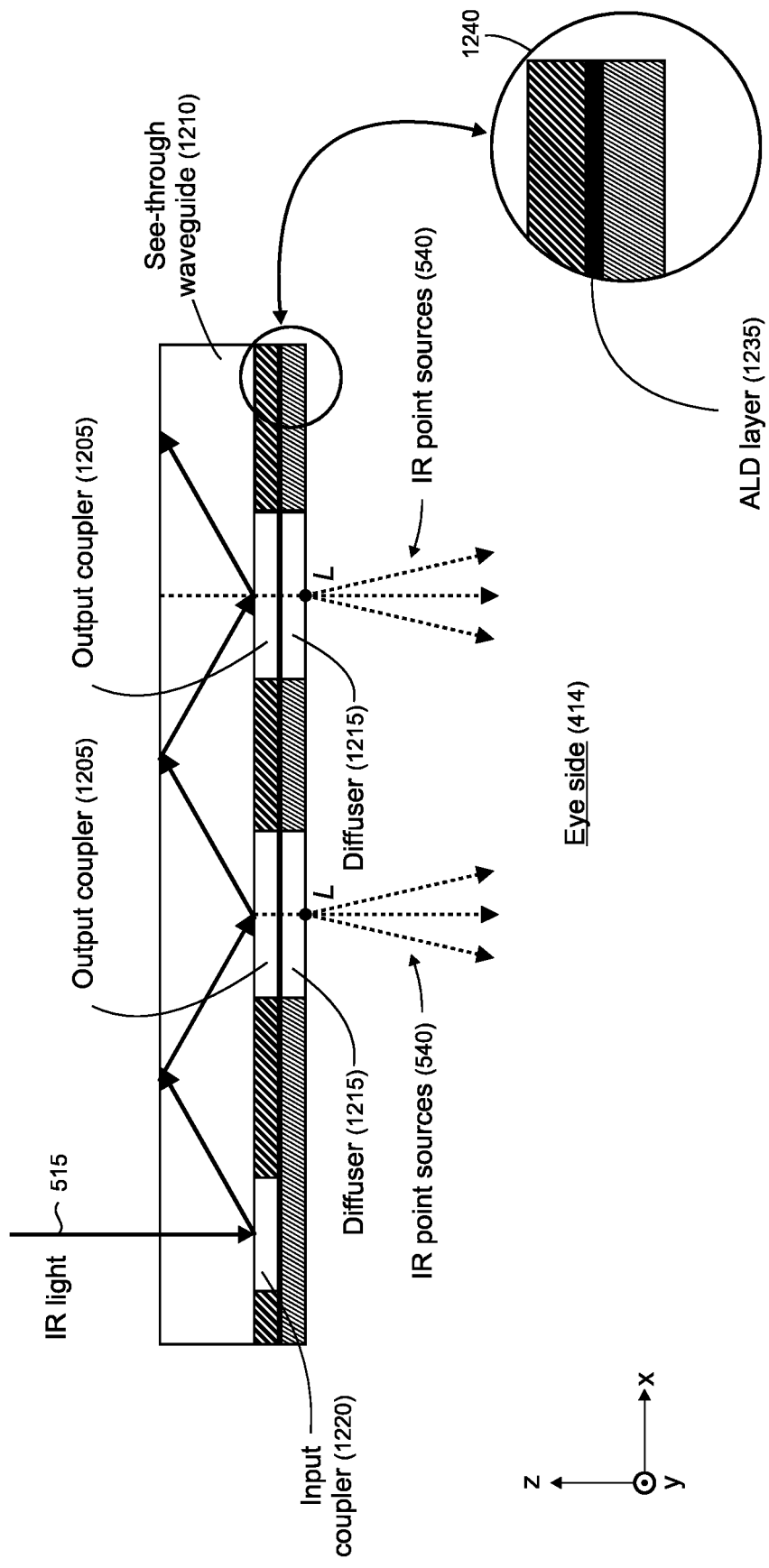
FIG. 12 shows a simplified top view of an illustrative example of a single-sided, dual-layered eye tracker illumination system waveguide architecture in which output couplers and diffusers are located on the same side of a see-through waveguide.

As shown in FIG. 12, the resins used for molding the DOE features in the light coupling components and diffusers on the same side of the waveguide substrate can be substantially similar if the resin layers are separated by an additional layer to provide the necessary refractive index contrast in the light path. In this illustrative example, as with architecture 1100, the eye tracker illumination system waveguide architecture 1200 provides for the input coupler 1220, output couplers 1205, and diffusers 1215 being located on the same side of a see-through waveguide 1210.

As shown, the input coupler 1220 and output couplers 1205 are molded in resin 1225 on the real-world side of the waveguide 1210. The diffusers 1215 are molded in resin 1230 on the eye side of the waveguide. An ALD (atomic layer deposition) layer 1235 or other suitable layer is disposed between the resins 1225 and 1230 as shown in the enlarged view indicated by reference numeral 1240 in the drawing. In an alternative embodiment, either the input or output couplers can be located on opposite sides of the waveguide so that a dual-sided, dual-layered architecture is implemented (not shown).

Figure 13:
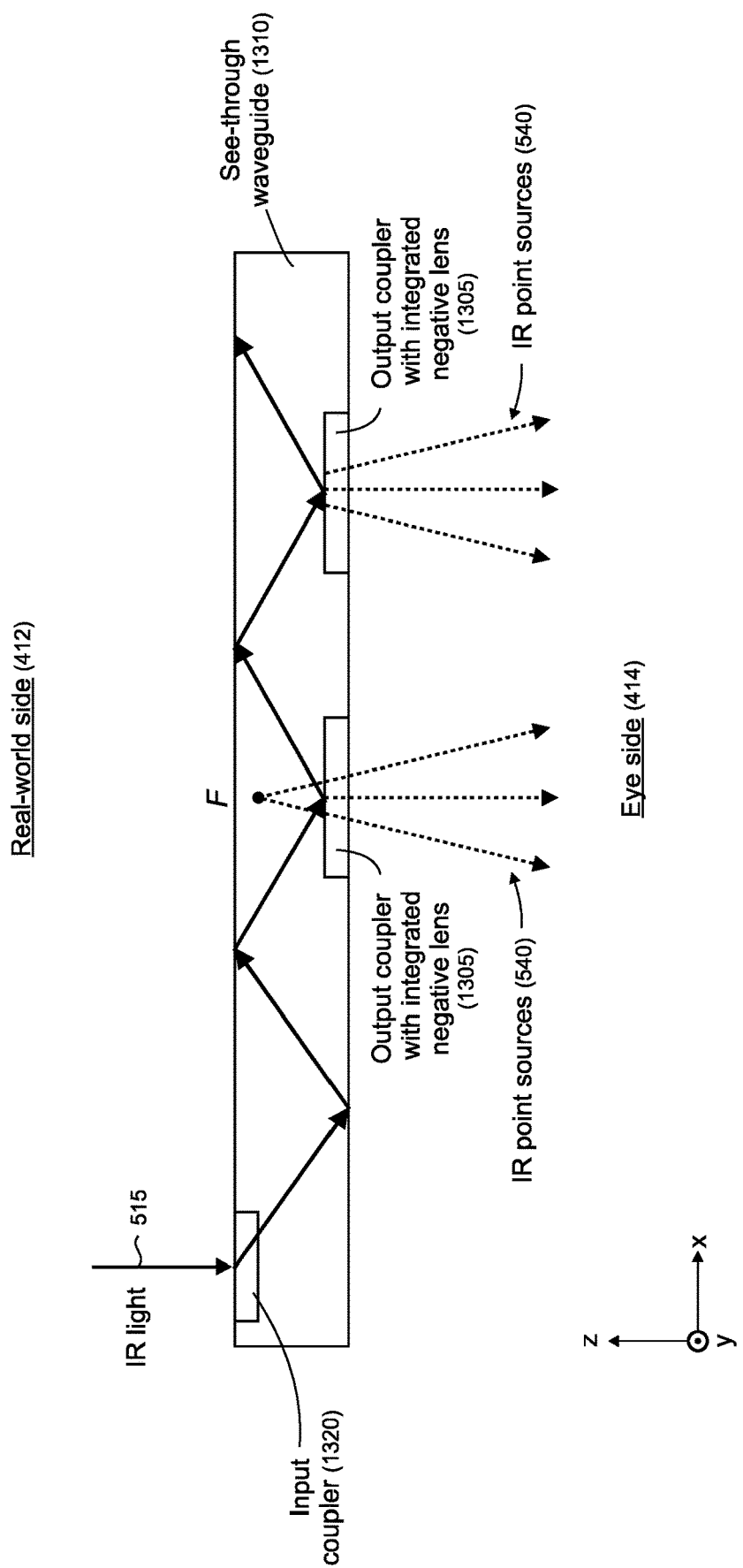
FIG. 13 shows a simplified top view of an illustrative example of a dual-sided eye tracker illumination system waveguide architecture that uses output couplers incorporating a negative lens functionality.

FIG. 13 shows a simplified top view of an illustrative example of a dual-sided eye tracker illumination system waveguide architecture 1300 that uses output couplers 1305 that incorporate a negative lens functionality. By combining the out-coupling and negative lens functions in a single optical element or DOE (e.g., a diffractive negative lens), the diffuser element utilized in the previous illustrative embodiments can be eliminated. The output couplers with integrated negative lens are configured in this illustrative example to place the apparent focal point F beneath the surface of the output coupler and waveguide, as shown. It may be appreciated that the depth of the focal point F along the z axis may be adjusted by changing the power of the negative lens in any given design.

The architecture 1300 is dual-sided in this illustrative example as the input coupler 1320 is located on the real-world side of the see-through waveguide 1310. The output couplers with the integrated negative lens functionality are located on the eye side of the waveguide. The input coupler and output couplers can be fabricated directly into the substrate of the waveguide, as with the exemplary architecture 900 shown in FIG. 9 or be fabricated using the molded resins (not shown) as described in the text accompanying FIG. 10.

Figure 14:
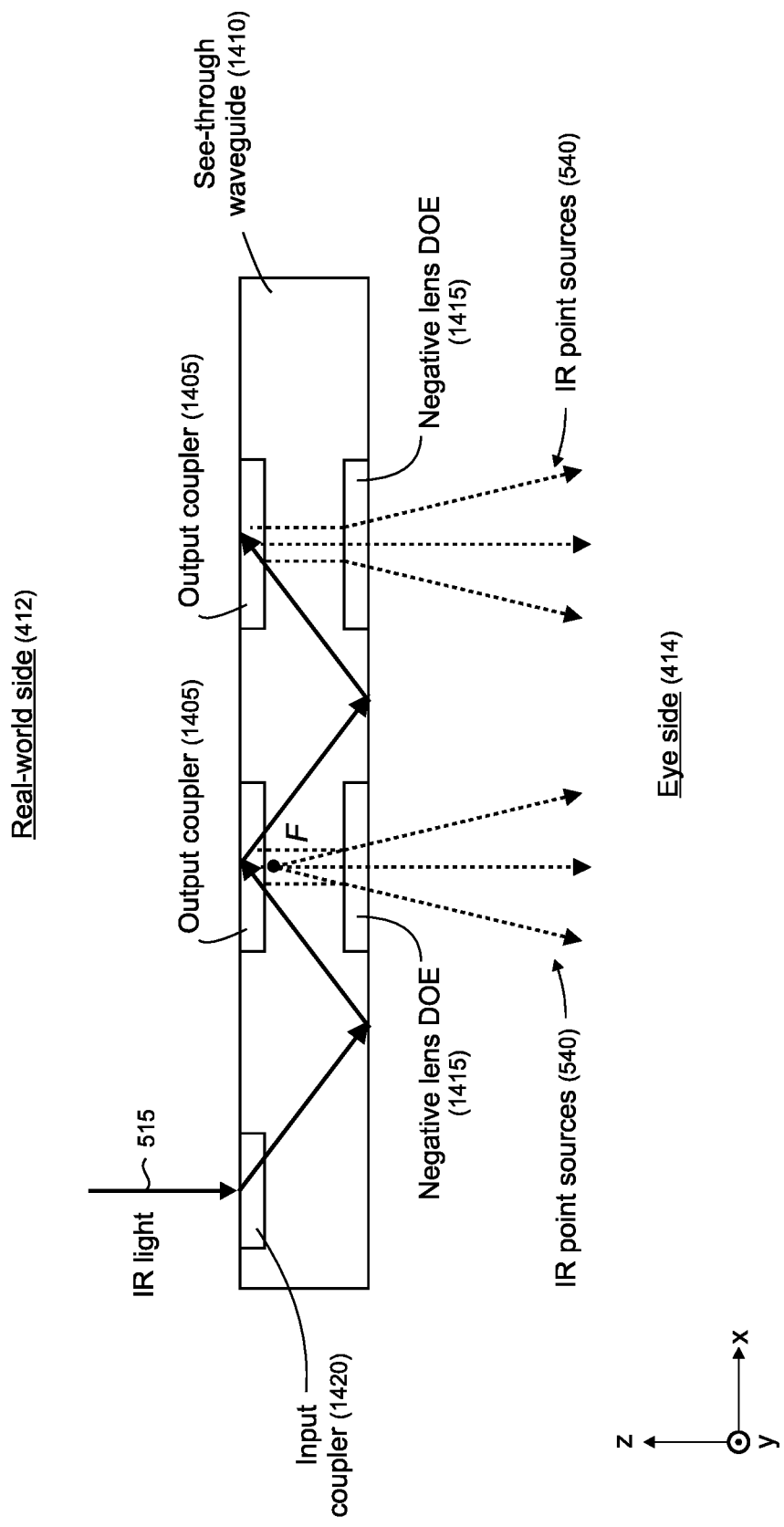
FIG. 14 shows a simplified top view of an illustrative example of a dual-sided eye tracker illumination system waveguide architecture that separates the functions of output coupling and negative lens into separate elements which are located on opposite sides of a see-through waveguide.

FIG. 14 shows a simplified top view of an illustrative example of a dual-sided eye tracker illumination system waveguide architecture 1400 that separates the functions of output coupling and negative lens into separate elements which are located on opposite sides of a see-through waveguide 1410. The input coupler 1420 and output couplers 1405 are disposed on the real-world side of the waveguide 1410 which may be implemented, for example, as DOEs that are fabricated directly in the waveguide substrate or fabricated in molded resins (not shown).

A DOE 1415 is configured to provide negative lens functionality but not out-coupling functionality using either direct or molded fabrication. As with the architecture 1300 shown in FIG. 13 and described in the accompanying text, the apparent focal point F is located beneath the surface of the DOE and waveguide 1410, as shown. In an alternative embodiment, either the input and output couplers can be located on the same side of the waveguide as the DOEs using multiple resin layers (with or without the ALD layer as discussed above) so that a single-sided, dual-layered architecture is implemented (not shown). The negative lens DOE 1415 may be alternatively implemented as a discrete functional element that is separate from the waveguide 1410.

The negative lens functionality in the output coupler 1305 (FIG. 13) and negative lens DOE 1415 (FIG. 14) may be implemented, for example, using linear gratings for which pitch, and curvature (in the plane of the coupler substrate) are modulated. Maintaining a predetermined relationship between groove spacing and curvature can be expected to impart a partially spherical shape to the diffractive wavefronts. In addition to curved grating lines implemented in a DOE, it may be appreciated that a negative lens functionality may be implemented using freeform surface optics, one or more Fresnel lenses, or any other suitable technology. The approach utilized for the negative lens functionality may be selected to meet the needs of a particular application of the present glint-based eye tracker illumination.

In the real world as shown in FIG. 15A, light rays 1505 from distant objects 1510 reaching an eye of a user 115 are almost parallel. Real-world objects at optical infinity (roughly around 6 m and farther for normal vision) have light rays 1520 that are exactly parallel when reaching the eye, as shown in FIG. 15B. Light rays 1525 from a nearby real-world object 1530 reach the eye with different, more divergent angles, as shown in FIG. 15C, compared to those for more distant objects.

The output coupler 1305 (FIG. 13) and negative lens DOE 1415 (FIG. 14) may thus be adapted to incorporate a negative lens in view of the observation that the wave nature of light provides for spherical wavefronts. As shown in FIG. 16A, a distant object 1605 will have wavefronts 1610 that each have a particular radius of curvature. When an object is located at infinity, as shown in FIG. 16B, each of the spherical wavefronts 1615 has an infinite radius of curvature. The radius of curvature of each spherical wavefront 1620 decreases for a nearby object 1625 as shown in FIG. 16C. Therefore, manipulation of the configuration of the gratings in the output coupler 1305 and negative lens DOE 1415 to thereby impact a spherical shape to the wavefronts of the diffracted fields may be expected to provide a sufficient negative optical power to provide the desired range of angles in the IR point sources that are output from the present illumination system.

Figure 17:
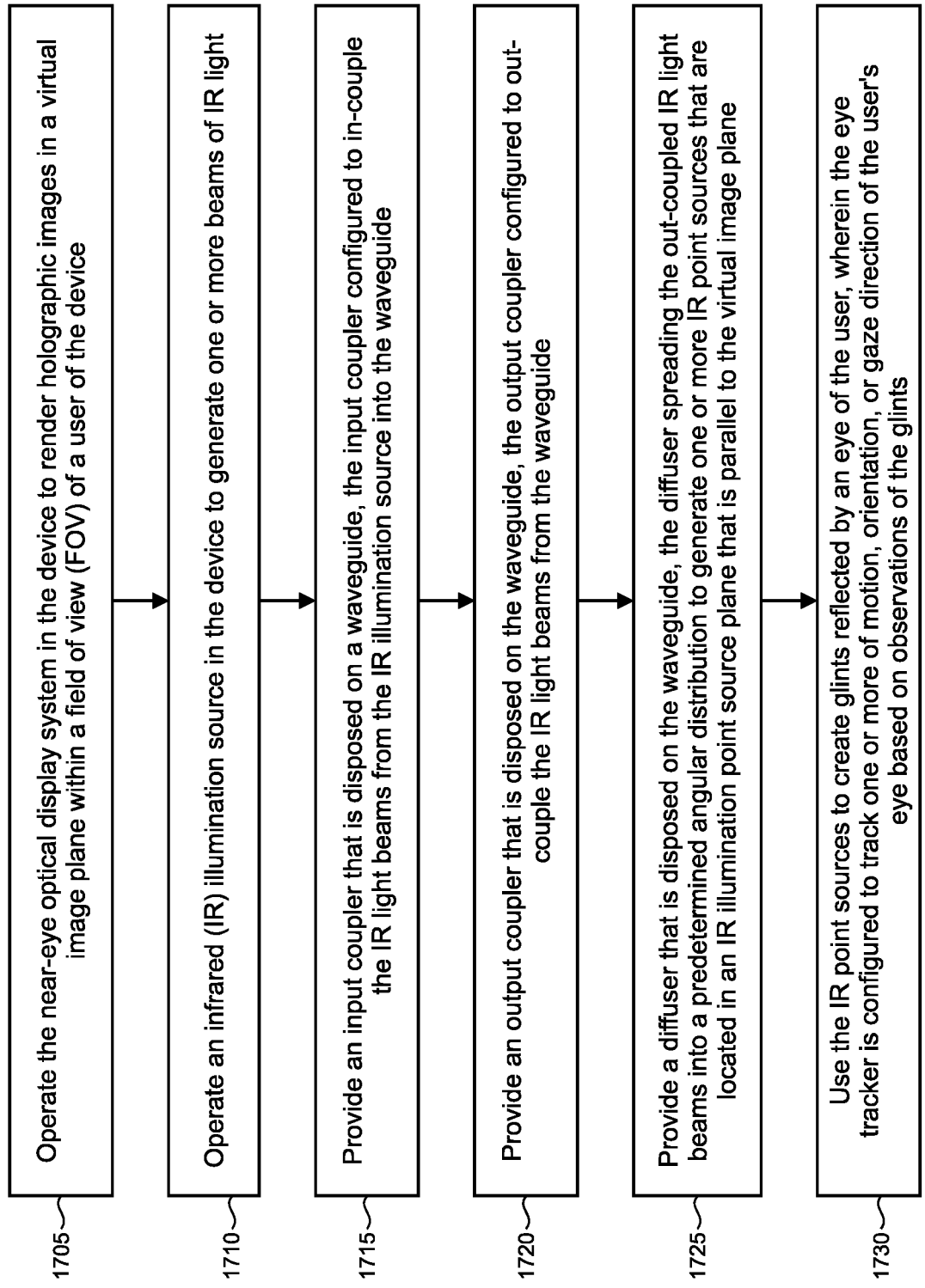
FIG. 17 is a flowchart of an illustrative method for operating an electronic device that includes a near-eye optical display system and an eye tracker.

FIG. 17 is a flowchart 1700 of an illustrative method for operating an electronic device that includes a near-eye optical display system and an eye tracker. Unless specifically stated, the methods or steps shown in the flowchart and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1705, the near-eye optical display system in the device is operated to render holographic images in a virtual image plane within a field of view (FOV) of a user of the device. In step 1710, an infrared (IR) illumination source in the device is operated to generate one or more beams of IR light. In step 1715, an input coupler is provided that is disposed on a waveguide, in which the input coupler is configured to in-couple the IR light beams from the IR illumination source into the waveguide. In step 1720, an output coupler is provided that is disposed on the waveguide, in which the output coupler is configured to out-couple the IR light beams from the waveguide.

In step 1725, a diffuser is provided that is disposed on the waveguide, in which the diffuser spreads the out-coupled IR light beams into a predetermined angular distribution to generate one or more IR point sources that are located in an IR illumination point source plane that is parallel to the virtual image plane. In step 1730, the IR point sources are used to create glints reflected by an eye of the user, wherein the eye tracker is configured to track one or more of motion, orientation, or gaze direction of the user's eye based on observations of the glints.

Figure 18:
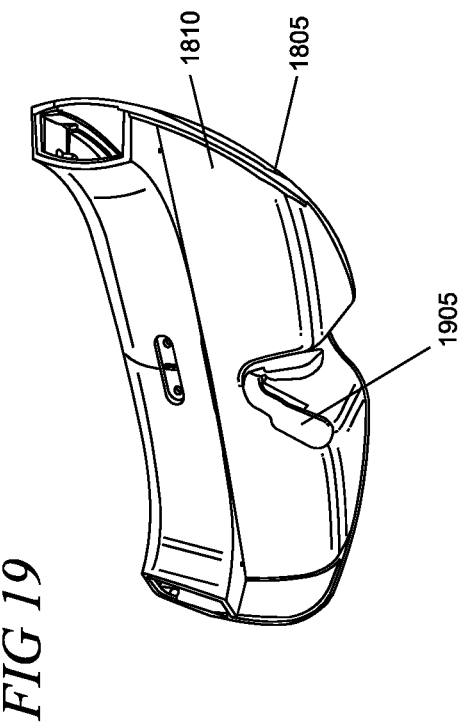
FIG. 18 shows a pictorial front view of an illustrative sealed visor that may be used as a component of an HMD device.
Figure 19:
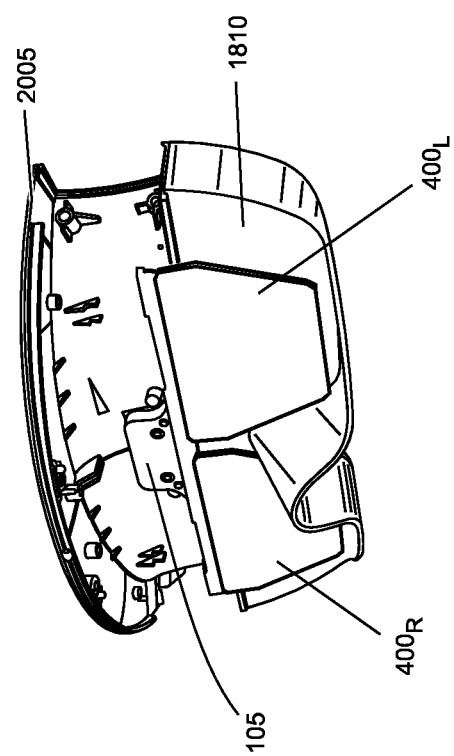
FIG. 19 shows a pictorial rear view of an illustrative sealed visor.

FIGS. 18 and 19 show respective front and rear views of an illustrative example of a visor 1800 that incorporates an internal near-eye display device 105 (FIGS. 1 and 2) that is used in the HMD device 100 as worn by a user 115. The visor, in some implementations, may be sealed to protect the internal display device. The visor typically interfaces with other components of the HMD device such as head-mounting/retention systems and other subsystems including sensors, power management, controllers, etc., as illustratively described in conjunction with FIGS. 25 and 26. Suitable interface elements (not shown) including snaps, bosses, screws, and other fasteners, etc. may also be incorporated into the visor.

Figure 20:
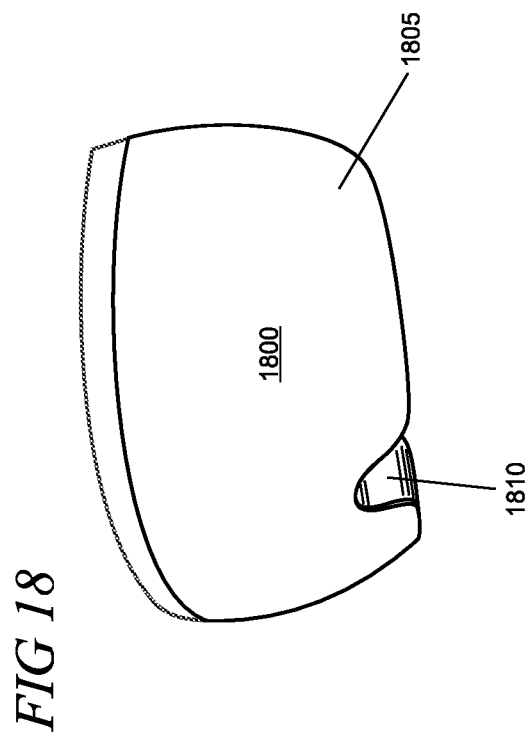
FIG. 20 shows a partially disassembled view of an illustrative sealed visor.

The visor 1800 may include see-through front and rear shields, 1805 and 1810 respectively, that can be molded using transparent or partially transparent materials to facilitate unobstructed vision to the display device and the surrounding real-world environment. Treatments may be applied to the front and rear shields such as tinting, mirroring, anti-reflective, anti-fog, and other coatings, and various colors and finishes may also be utilized. The front and rear shields are affixed to a chassis 2005 shown in the disassembled view in FIG. 20.

The sealed visor 1800 can physically protect sensitive internal components, including a display device 105, when the HMD device is operated and during normal handling for cleaning and the like. The display device in this illustrative example includes left and right waveguides 400L and 400R that respectively provide holographic virtual images to the user's left and right eyes for mixed- and/or virtual-reality applications. The visor can also protect the display device from environmental elements and damage should the HMD device be dropped or bumped, impacted, etc.

As shown in FIG. 19, the rear shield 1810 is configured in an ergonomically suitable form 1905 to interface with the user's nose, and nose pads and/or other comfort features can be included (e.g., molded-in and/or added-on as discrete components). In some applications, the sealed visor 1810 can also incorporate some level of optical diopter curvature (i.e., eye prescription) within the molded shields in some cases. The sealed visor 1800 can also be configured to incorporate the conjugate lens pair—the negative lens 435 and positive lens 450 (FIG. 4) on either side of the virtual display system waveguide 410.

Figure 21:
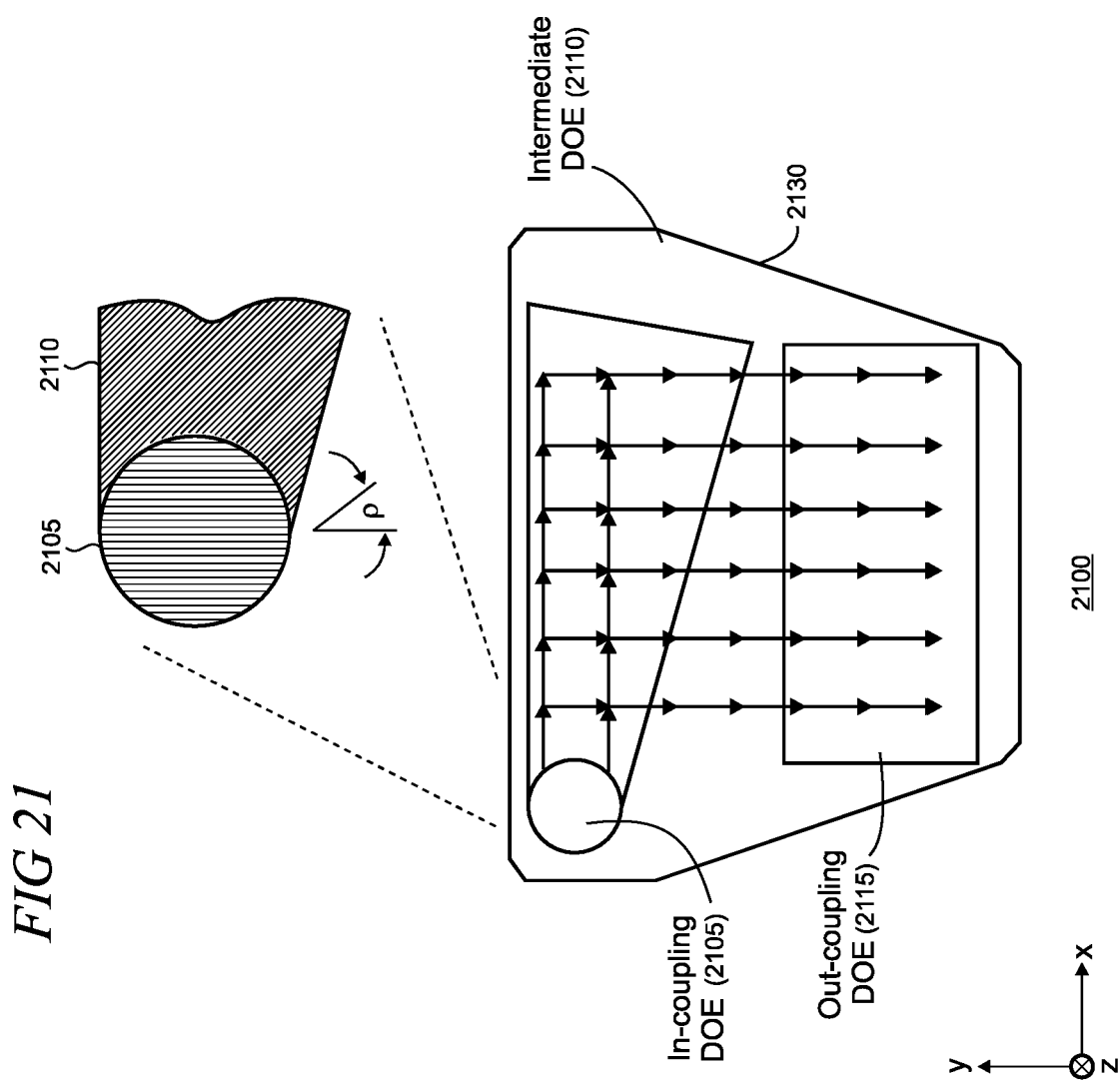
FIG. 21 shows an illustrative arrangement of diffractive optical elements (DOEs) configured for in-coupling, exit pupil expansion in two directions, and out-coupling.

FIG. 21 shows an illustrative waveguide display 2100 having multiple DOEs that may be used as an embodiment of the see-through waveguide 410 in the virtual display system 400 (FIG. 4) to provide in-coupling, expansion of the exit pupil in two directions, and out-coupling. The waveguide display 2100 may be utilized to provide holographic virtual images from a virtual image source to one of the user's eyes. Each DOE is an optical element comprising a periodic structure that can modulate various properties of light in a periodic pattern such as the direction of optical axis, optical path length, and the like. The structure can be periodic in one dimension such as one-dimensional (1D) grating and/or be periodic in two dimensions such as two-dimensional (2D) grating.

The waveguide display 2100 includes an in-coupling DOE 2105, an out-coupling DOE 2115, and an intermediate DOE 2110 that couples light between the in-coupling and out-coupling DOEs. The in-coupling DOE is configured to couple image light comprising one or more imaging beams from a virtual image source 420 (FIG. 4) into a waveguide 2130. The intermediate DOE expands the exit pupil in a first direction along a first coordinate axis (e.g., horizontal), and the out-coupling DOE expands the exit pupil in a second direction along a second coordinate axis (e.g., vertical) and couples light out of the waveguide to the user's eye (i.e., outwards from the plane of the drawing page). The angle ρ is a rotation angle between the periodic lines of the in-coupling DOE and the intermediate DOE as shown. As the light propagates in the intermediate DOE (horizontally from left to right in the drawing), it is also diffracted (in the downward direction) to the out-coupling DOE.

While DOEs are shown in this illustrative example using a single in-coupling DOE disposed to the left of the intermediate DOE 2110, which is located above the out-coupling DOE, in some implementations, the in-coupling DOE may be centrally positioned within the waveguide and one or more intermediate DOEs can be disposed laterally from the in-coupling DOE to enable light to propagate to the left and right while providing for exit pupil expansion along the first direction. It may be appreciated that other numbers and arrangements of DOEs may be utilized to meet the needs of a particular implementation.

FIG. 22 shows a profile of straight (i.e., non-slanted) grating features 2200 (referred to as grating bars, grating lines, or simply "gratings"), that are formed in a substrate 2205. By comparison, FIG. 23 shows grating features 2300 formed in a substrate 2305 that have an asymmetric profile. That is, the gratings may be slanted (i.e., non-orthogonal) relative to a plane of the waveguide. In implementations where the waveguide is non-planar, then the gratings may be slanted relative to a direction of light propagation in the waveguide. Asymmetric grating profiles can also be implemented using blazed gratings, or echelette gratings, in which grooves are formed to create grating features with asymmetric triangular or sawtooth profiles. In FIGS. 22 and 23, the grating period is represented by d, the grating height by h (also referred to as grating "depth"), bar width by c, and the fill factor by f, where f=c/d. The slanted gratings in FIG. 23 may be described by slant angles $\alpha_1$ and $\alpha_2$.

As noted above, in implementations using a color model such as RGB, multiple waveguides may be utilized in the display device 105 (FIGS. 1 and 2). FIG. 24 shows illustrative propagation of light from a virtual image source 2402 through an optical combiner 2400 that uses a separate waveguide for each color component in the RGB color model. The light from the virtual image source may be utilized for virtual image projection and eye tracker illumination in accordance with the present principles of the invention. In alternative implementations, two waveguides may be utilized in which one waveguide can support two color components and the other waveguide may support a single color component.

For a given angular range within the virtual FOV, light for each color component 2405, 2410, and 2415 provided by the virtual image source 2402 is in-coupled into respective waveguides 2430, 2435, and 2440 using respective individual input couplers (representatively indicated by element 2420). The light for each color propagates through the respective waveguides in TIR and is out-coupled by respective output couplers (representatively indicated by element 2425) to the eye of the user 115. In some implementations the output may have an expanded pupil relative to the input in the horizontal and vertical directions, for example when using DOEs that provide for pupil expansion, as discussed above.

The input coupler 2420 for each waveguide 2430, 2435, and 2440 is configured to in-couple light within an angular range described by the FOV and within a particular wavelength range into the waveguide. Light outside the wavelength range passes through the waveguide. For example, the blue light 2405 is outside the range of wavelength sensitivity for both of the input couplers in the red waveguide 2440 and green waveguide 2435. The blue light therefore passes through the red and green waveguides to reach the in-coupling DOE in the blue waveguide 2430 where it is in-coupled, propagated in TIR within the waveguide, propagated to the output coupler and out-coupled to the eye of the user 115.

Figure 25:
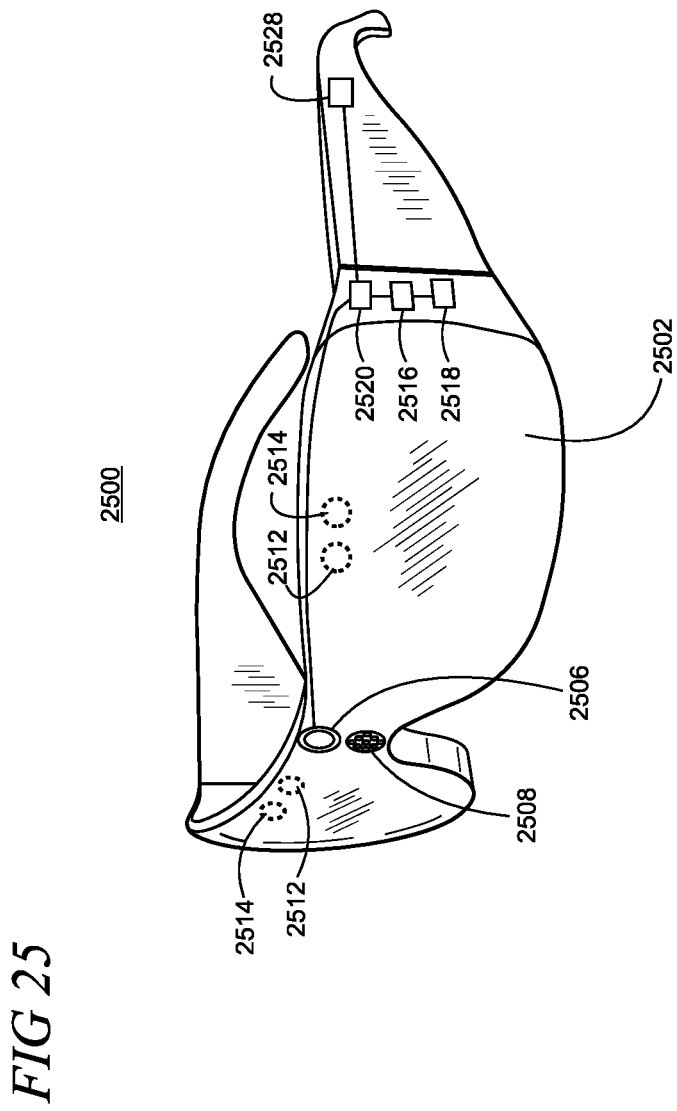
FIG. 25 is a pictorial view of an illustrative example of a virtual-reality or mixed-reality HMD device that may use the present glint-based eye tracker illumination.
Figure 26:
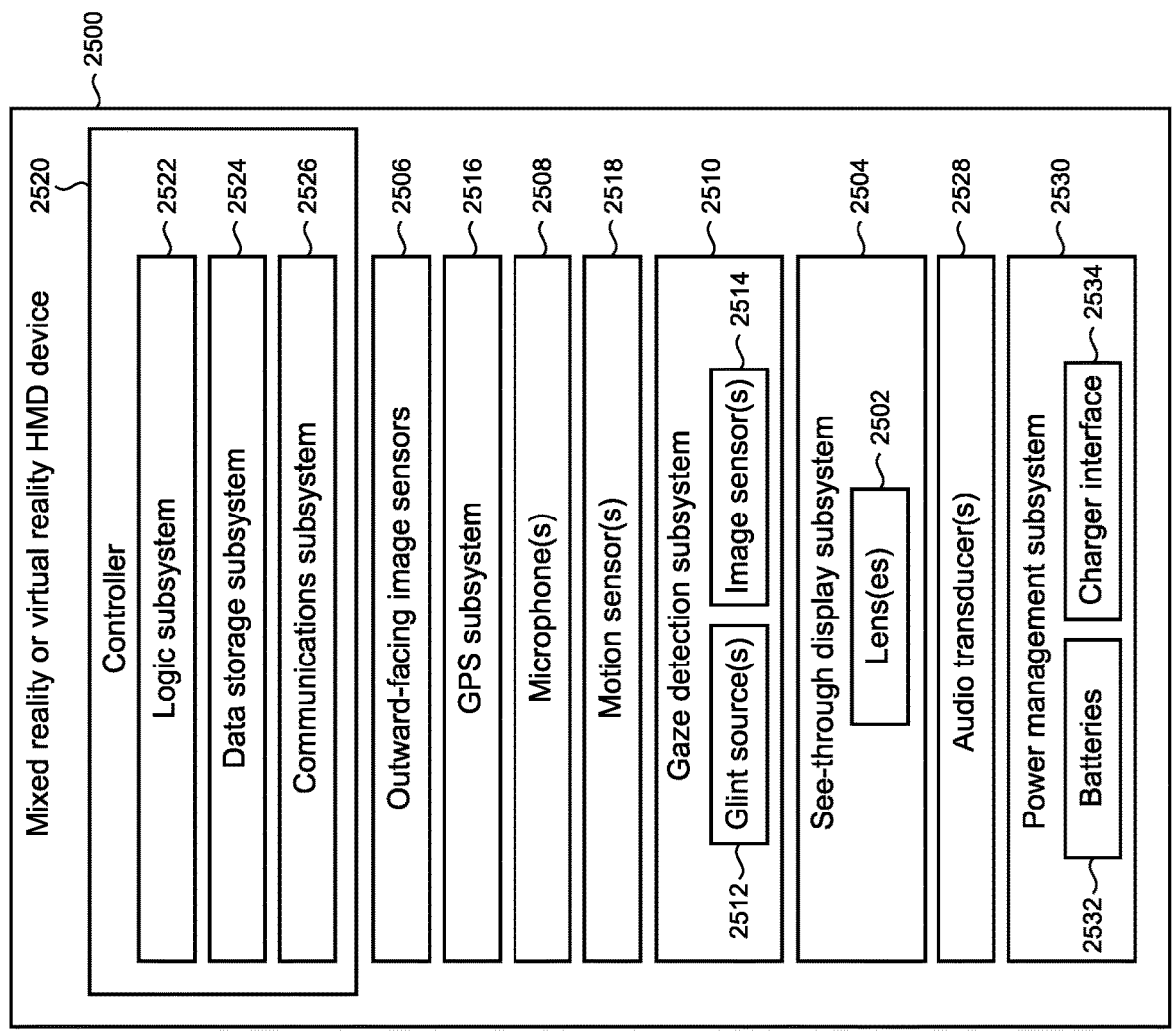
FIG. 26 shows a block diagram of an illustrative example of a virtual-reality or mixed-reality HMD device that may use the present glint-based eye tracker illumination.

As noted above, the present glint-based eye tracker illumination may be utilized in mixed- or virtual-reality applications. FIG. 25 shows one particular illustrative example of a mixed-reality HMD device 2500, and FIG. 26 shows a functional block diagram of the device 2500. The HMD device 2500 provides an alternative form factor to the HMD device 100 shown in FIGS. 1, 2, 11, 12, and 13. HMD device 2500 comprises one or more lenses 2502 that form a part of a see-through display subsystem 2504, so that images may be displayed using lenses 2502 (e.g., using projection onto lenses 2502, one or more waveguide systems, such as a near-eye display system, incorporated into the lenses 2502, and/or in any other suitable manner).

HMD device 2500 further comprises one or more outward-facing image sensors 2506 configured to acquire images of a background scene and/or physical environment being viewed by a user and may include one or more microphones 2508 configured to detect sounds, such as voice commands from a user. Outward-facing image sensors 2506 may include one or more depth sensors and/or one or more two-dimensional image sensors. In alternative arrangements, as noted above, a mixed-reality or virtual-reality display system, instead of incorporating a see-through display subsystem, may display mixed-reality or virtual-reality images through a viewfinder mode for an outward-facing image sensor.

The HMD device 2500 may further include a gaze detection subsystem 2510 configured for detecting a direction of gaze of each eye of a user or a direction or location of focus, as described above. Gaze detection subsystem 2510 may be configured to determine gaze directions of each of a user's eyes in any suitable manner. For example, in the illustrative example shown, a gaze detection subsystem 2510 includes one or more point sources 2512, such as virtual IR light or visible sources as described above, that are configured to cause a glint of light to reflect from each eyeball of a user, and one or more image sensors 2514, such as inward-facing sensors, that are configured to capture an image of each eyeball of the user. Changes in the glints from the user's eyeballs and/or a location of a user's pupil, as determined from image data gathered using the image sensor(s) 2514, may be used to determine a direction of gaze.

In addition, a location at which gaze lines projected from the user's eyes intersect the external display may be used to determine an object at which the user is gazing (e.g., a displayed virtual object and/or real background object). Gaze detection subsystem 2510 may have any suitable number and arrangement of light sources and image sensors. In some implementations, the gaze detection subsystem 2510 may be omitted.

The HMD device 2500 may also include additional sensors. For example, HMD device 2500 may comprise a global positioning system (GPS) subsystem 2516 to allow a location of the HMD device 2500 to be determined. This may help to identify real-world objects, such as buildings, etc., that may be located in the user's adjoining physical environment.

The HMD device 2500 may further include one or more motion sensors 2518 (e.g., inertial, multi-axis gyroscopic, or acceleration sensors) to detect movement and position/orientation/pose of a user's head when the user is wearing the system as part of a mixed-reality or virtual-reality HMD device. Motion data may be used, potentially along with eye-tracking glint data and outward-facing image data, for gaze detection, as well as for image stabilization to help correct for blur in images from the outward-facing image sensor(s) 2506. The use of motion data may allow changes in gaze direction to be tracked even if image data from outward-facing image sensor(s) 2506 cannot be resolved.

In addition, motion sensors 2518, as well as microphone(s) 2508 and gaze detection subsystem 2510, also may be employed as user input devices, such that a user may interact with the HMD device 2500 via gestures of the eye, neck and/or head, as well as via verbal commands in some cases. It may be understood that sensors illustrated in FIGS. 25 and 26 and described in the accompanying text are included for the purpose of example and are not intended to be limiting in any manner, as any other suitable sensors and/or combination of sensors may be utilized to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The HMD device 2500 can further include a controller 2520 such as one or more processors having a logic subsystem 2522 and a data storage subsystem 2524 in communication with the sensors, gaze detection subsystem 2510, display subsystem 2504, and/or other components through a communications subsystem 2526. The communications subsystem 2526 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 2524 may include instructions stored thereon that are executable by logic subsystem 2522, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The HMD device 2500 is configured with one or more audio transducers 2528 (e.g., speakers, earphones, etc.) so that audio can be utilized as part of a mixed-reality or virtual-reality experience. A power management subsystem 2530 may include one or more batteries 2532 and/or protection circuit modules (PCMs) and an associated charger interface 2534 and/or remote power interface for supplying power to components in the HMD device 2500.

It may be appreciated that the HMD device 2500 is described for the purpose of example, and thus is not meant to be limiting. It may be further understood that the display device may include additional and/or alternative sensors, cameras, microphones, input devices, output devices, etc. than those shown without departing from the scope of the present arrangement. Additionally, the physical configuration of an HMD device and its various sensors and subcomponents may take a variety of different forms without departing from the scope of the present arrangement.

Figure 27:
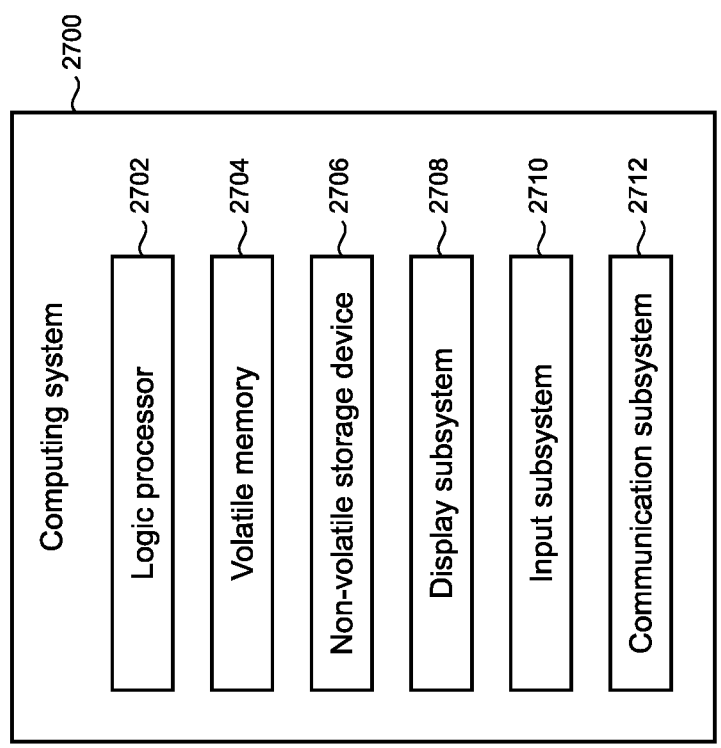
FIG. 27 schematically shows an illustrative example of a computing system that can enact one or more of the methods and processes described above for the present glint-based eye tracker illumination.

FIG. 27 schematically shows an illustrative example of a computing system that can enact one or more of the methods and processes described above for the present glint-based eye tracker illumination. Computing system 2700 is shown in simplified form. Computing system 2700 may take the form of one or more personal computers, server computers, tablet computers, home-entertainment computers, network computing devices, gaming devices, mobile computing devices, mobile communication devices (e.g., smartphone), wearable computers, and/or other computing devices.

Computing system 2700 includes a logic processor 2702, volatile memory 2704, and a non-volatile storage device 2706. Computing system 2700 may optionally include a display subsystem 2718, input subsystem 2710, communication subsystem 2712, and/or other components not shown in FIG. 27.

Logic processor 2702 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more processors configured to execute software instructions. In addition, or alternatively, the logic processor may include one or more hardware or firmware logic processors configured to execute hardware or firmware instructions. Processors of the logic processor may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects may be run on different physical logic processors of various different machines.

Non-volatile storage device 2706 includes one or more physical devices configured to hold instructions executable by the logic processors to implement the methods and processes described herein. When such methods and processes are implemented, the state of non-volatile storage device 2706 may be transformed—e.g., to hold different data.

Non-volatile storage device 2706 may include physical devices that are removable and/or built-in. Non-volatile storage device 2706 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 2706 may include nonvolatile, dynamic, static, read/write, read-only, sequential-access, location-addressable, file-addressable, and/or content-addressable devices. It will be appreciated that non-volatile storage device 2706 is configured to hold instructions even when power is cut to the non-volatile storage device 2706.

Volatile memory 2704 may include physical devices that include random access memory. Volatile memory 2704 is typically utilized by logic processor 2702 to temporarily store information during processing of software instructions. It will be appreciated that volatile memory 2704 typically does not continue to store instructions when power is cut to the volatile memory 2704.

Aspects of logic processor 2702, volatile memory 2704, and non-volatile storage device 2706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 2700 typically implemented in software by a processor to perform a particular function using portions of volatile memory, which function involves transformative processing that specially configures the processor to perform the function. Thus, a program may be instantiated via logic processor 2702 executing instructions held by non-volatile storage device 2706, using portions of volatile memory 2704. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

When included the display subsystem 2708 may be used to present a visual representation of data held by non-volatile storage device 2706. This visual representation may take the form of a graphical user interface (GUI). As the herein described methods and processes change the data held by the non-volatile storage device, and thus transform the state of the non-volatile storage device, the state of display subsystem 2708 may likewise be transformed to visually represent changes in the underlying data. Display subsystem 2708 may include one or more display devices utilizing virtually any type of technology; however, one utilizing a MEMS projector to direct laser light may be compatible with the eye-tracking system in a compact manner. Such display devices may be combined with logic processor 2702, volatile memory 2704, and/or non-volatile storage device 2706 in a shared enclosure, or such display devices may be peripheral display devices.

When included the input subsystem 2710 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included the communication subsystem 2712 may be configured to communicatively couple various computing devices described herein with each other, and with other devices. Communication subsystem 2712 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 2700 to send and/or receive messages to and/or from other devices via a network such as the Internet.

Various exemplary embodiments of the present glint-based eye tracker illumination are now presented by way of illustration and not as an exhaustive list of all embodiments. An example includes an illumination system, disposed in a near-eye mixed-reality display system, adapted for providing illumination for an eye tracker, comprising: at least one see-through optical waveguide through which real-world images are viewable by a user of the mixed-reality display system; an input coupler disposed on the see-through optical waveguide configured to in-couple one or more beams of infrared (IR) light from an IR illumination source into the see-through optical waveguide; an output coupler disposed on the see-through optical waveguide configured to out-couple the one or more beams of IR light from the see-through optical waveguide; a diffuser disposed on the see-through optical waveguide configured to spread the out-coupled one or more beams of IR light into a predetermined angular distribution to generate one or more IR point sources, wherein the diffuser is aligned along a propagation path of the one or more beams of IR light that are out-coupled from the output coupler.

In another example, the illumination system is configured in a dual-sided architecture in which the output coupler is located on a first side of the see-through optical waveguide and the diffuser is located on a second side of the see-through optical waveguide that is opposite the first side. In another example, the illumination system is configured in a dual-layered architecture in which the output coupler is located on a first layer that is disposed on a side of the see-through optical waveguide and the diffuser is located on a second layer that is disposed on the first layer. In another example, each of the first and second layers comprises resins having a common refractive index, and wherein a layer of material is disposed between the first and second layers of resin, the material having a refractive index that is different from the common refractive index In another example, each of the first and second layers comprises resins having different refractive indices.

A further example includes a head-mounted display (HMD) device wearable by a user and supporting a mixed-reality experience including viewing holographic images from a virtual world that are combined with real-world images of objects in a physical world, comprising: a see-through waveguide-based display system through which the user can view the physical world and on which the holographic images are rendered within a field of view (FOV) of the display system; an infrared (IR) illumination source generating one or more beams of IR light; a waveguide-based illumination system including an illumination system waveguide, at least one input coupler disposed on the illumination system waveguide, and at least one output coupler disposed on the illumination system waveguide, the input coupler configured for in-coupling the beams of IR light from the IR illumination source into the illumination system waveguide, and the output coupler configured for out-coupling the beams of IR light from the illumination system waveguide, wherein the output coupler is at least partially aligned with the FOV of the display system; and at least one optical component disposed on the illumination system waveguide, the optical component being configured to spread the out-coupled beams of IR light into divergent beams of IR light within a predefined range of spreading angles to generate one or more IR point sources that are located within the FOV of the display system.

In another example, the optical component disposed on the illumination system waveguide comprises a diffuser. In another example, the optical component disposed on the illumination system waveguide comprises a diffractive negative lens. In another example, the HMD device further comprises one or more sensors configured to capture glints from the IR point sources that are reflected from features of an eye of the user for eye tracking. In another example, the HMD device further comprises an eye tracker that is operatively coupled to the IR illumination source and the sensors, the eye tracker configured to control the IR illumination source and the sensors to generate glints and capture images of the glints for eye tracking. In another example, the eye tracker is configured to dynamically operate the IR illumination source to generate a temporally or spatially variably configurable pattern of IR point sources. In another example, the see-through waveguide-based display system comprises one or more display system waveguides that each include an input coupler and an output coupler, in which the input coupler is configured to in-couple one or more optical beams for the holographic images into the display system waveguides and the output coupler is configured to out-couple the holographic image beams from the display system waveguides to an eye of the user, in which holographic images associated with the out-coupled beams are rendered within the FOV of the display system. In another example, at least one of the input coupler or output coupler is configured as a diffractive optical element (DOE). In another example, the HMD device further comprises a positive lens and a negative lens that are operable as a conjugate pair, the positive lens disposed on a real-world side of the see-through waveguide-based display system and the negative lens disposed on an eye side of the see-through waveguide-based display system, wherein the negative lens is configured to impart virtual focus to the holographic images at a non-infinite distance from the HNMD device. In another example, the illumination system is disposed on the negative lens. In another example, the illumination system is laminated on a non-optical component of the HMD device or is laminated on an optical component of the HMD device. In another example, the holographic images conform with a color model having a plurality of components, the holographic images being rendered utilizing at least one display system waveguide configured to propagate a color component of the holographic images and wherein the illumination system waveguide comprises the display system waveguide utilized to propagate the color component.

A further example includes a method for operating an electronic device that includes a near-eye optical display system and an eye tracker, comprising: operating the near-eye optical display system in the device to render holographic images in a virtual image plane within a field of view (FOV) of a user of the device; operating an infrared (IR) illumination source in the device to generate one or more beams of IR light; providing an input coupler that is disposed on a waveguide, the input coupler configured to in-couple the IR light beams from the IR illumination source into the waveguide; providing an output coupler that is disposed on the waveguide, the output coupler configured to out-couple the IR light beams from the waveguide; providing a diffuser that is disposed on the waveguide, the diffuser spreading the out-coupled IR light beams into a predetermined angular distribution to generate one or more IR point sources that are located in an IR illumination point source plane that is parallel to the virtual image plane; and using the IR point sources to create glints reflected by an eye of the user, wherein the eye tracker is configured to track one or more of motion, orientation, or gaze direction of the user's eye based on observation of the glints.

In another example, the predetermined angular distribution of IR point sources is smaller than the angular distribution of the FOV of the near-eye optical display system. In another example, one or more of the input coupler, output coupler, or diffuser are configured as diffractive optical elements (DOEs).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. An illumination system, disposed in a near-eye mixed-reality display system, adapted for providing illumination for an eye tracker, comprising:
   at least one see-through optical waveguide through which real-world images are viewable by a user of the mixed-reality display system;
   an input coupler disposed on a first layer of the see-through optical waveguide configured to in-couple one or more beams of infrared (IR) light from an IR illumination source into the see-through optical waveguide;
   an output coupler disposed on the first layer of the see-through optical waveguide configured to out-couple the one or more beams of IR light from the see-through optical waveguide;
   a diffuser disposed on a second layer of the see-through optical waveguide configured to spread the out-coupled one or more beams of IR light into a predetermined angular distribution to generate one or more IR point sources, wherein the diffuser is aligned along a propagation path of the one or more beams of IR light that are out-coupled from the output coupler; and
   a third layer of the optical waveguide separating the first and second layers, wherein the third layer has a refractive index that is different from a refractive index of the first layer or has a refractive index that is different from a refractive index of the second layer.

2. The illumination system of claim 1 in which the refractive index of the first layer substantially equals the refractive index of the second layer.

3. The illumination system of claim 1 in which the refractive index of the first, layer is different from the refractive index of the second layer.

4. The illumination system of claim 1 in which the third layer comprises an ALD (atomic layer deposition) layer.

5. The illumination system of claim 1 in which one or more of the first and second layers comprise resin layers.

6. The illumination system of claim 1 in which one or more of the first and second layers comprise directly-fabricated layers or comprise pre-fabricated diffractive grating features.

7. A head-mounted display (HMD) device wearable by a user and supporting a mixed-reality experience including viewing virtual images from a virtual world that are combined with real-world images of objects in a physical world, comprising:
   a waveguide-based display system through which the user can view the physical world and on which the virtual images are rendered within a field of view (FOV) of the display system;
   an infrared (IR) illumination source generating one or more beams of IR light:
   a waveguide-based illumination system including an illumination system waveguide, at least one input coupler disposed on the illumination system waveguide, and at least one output coupler disposed on the illumination system waveguide, the input coupler configured for in-coupling the beams of IR light from the IR illumination source into the illumination system waveguide, and the output coupler configured for out-coupling the beams of IR light from the illumination system waveguide, wherein the output coupler is at least partially aligned with the FOV of the display system;

at least one optical component disposed on the illumination system waveguide opposite to the at least one output coupler, the optical component being a discrete component that is separate from the at least one output coupler and configured to exclude out-coupling functionality and further configured to spread the out-coupled beams of IR light into divergent beams of IR light within a predefined range of spreading angles to generate one or more IR point sources that are located within the FOV of the display system;

one or more sensors configured to capture glints from the IR point sources that are reflected from features of an eye of the user; and an eye tracker operatively coupled to the IR illumination source and the one or more sensors, the eye tracker configured to control the IR illumination source and the one or more sensors to respectively generate glints and capture images of the glints for eye tracking.

8. The HMD device of claim 7 in which the optical component disposed on the illumination system waveguide comprises a diffuser.

9. The HMD device of claim 7 in which the optical component disposed on the illumination system waveguide comprises a diffractive negative lens.

10. The HMD device of claim 9 in which the diffractive negative lens comprises one of Fresnel lens or freeform optics lens.

11. The HMD device of claim 9 in which the diffractive negative lens comprises a diffractive optical element having curved grating structures configured to impart a partially spherical wavefront to light diffracted therefrom.

12. The HMD device of claim 7 in which the eye tracker is configured to dynamically operate the IR illumination source to generate a temporally or spatially variably configurable pattern of IR point sources.

13. The HMD device of claim 7 in which the input coupler and output coupler are disposed on opposite sides of the waveguide.

14. The HMD device of claim 7 in which the waveguide is configured to be at least partially see through.

* * * * *